United States Patent
Ota et al.

(10) Patent No.: US 8,515,264 B2
(45) Date of Patent: Aug. 20, 2013

(54) INFORMATION PROCESSING APPARATUS, INFORMATION PROCESSING METHOD, DISPLAY CONTROL APPARATUS, DISPLAY CONTROL METHOD, AND PROGRAM

(75) Inventors: Masashi Ota, Tokyo (JP); Noboru Murabayashi, Saitama (JP)

(73) Assignee: Sony Corporation, Tokyo (JP)

( * ) Notice: Subject to any disclaimer, the term of this patent is extended or adjusted under 35 U.S.C. 154(b) by 165 days.

(21) Appl. No.: 12/939,812

(22) Filed: Nov. 4, 2010

(65) Prior Publication Data

US 2011/0116771 A1    May 19, 2011

(30) Foreign Application Priority Data

Nov. 16, 2009   (JP) ................................ P2009-260659

(51) Int. Cl.
*H04N 5/783* (2006.01)
(52) U.S. Cl.
USPC .......................................................... 386/343

(58) Field of Classification Search
None
See application file for complete search history.

(56) References Cited

U.S. PATENT DOCUMENTS

| | | | |
|---|---|---|---|
| 2010/0150523 A1* | 6/2010 | Okubo et al. | 386/68 |
| 2012/0170909 A1* | 7/2012 | Chung et al. | 386/248 |

* cited by examiner

*Primary Examiner* — Thai Tran
*Assistant Examiner* — Sunghyoun Park
(74) *Attorney, Agent, or Firm* — Oblon, Spivak, McClelland, Maier & Neustadt, L.L.P.

(57) ABSTRACT

A video display control apparatus that includes a system controller that determines a reproduction speed of a video, and sets a parallax parameter corresponding to the reproduction speed of the video. The video display control apparatus also includes a content control unit that controls reproduction of the video based on the parallax parameter set by the system controller.

19 Claims, 21 Drawing Sheets

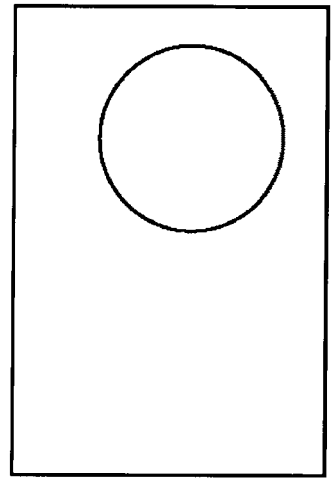
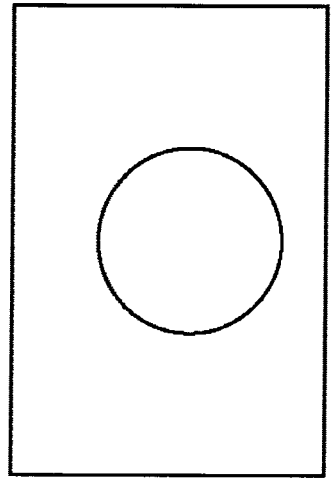
FIG.14A
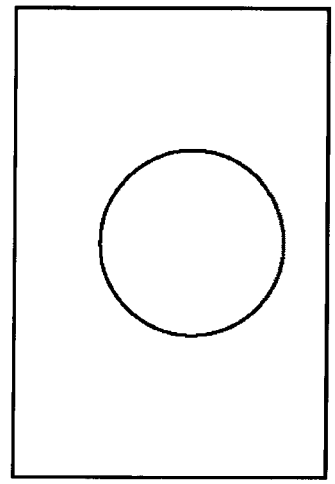
FIG.14B

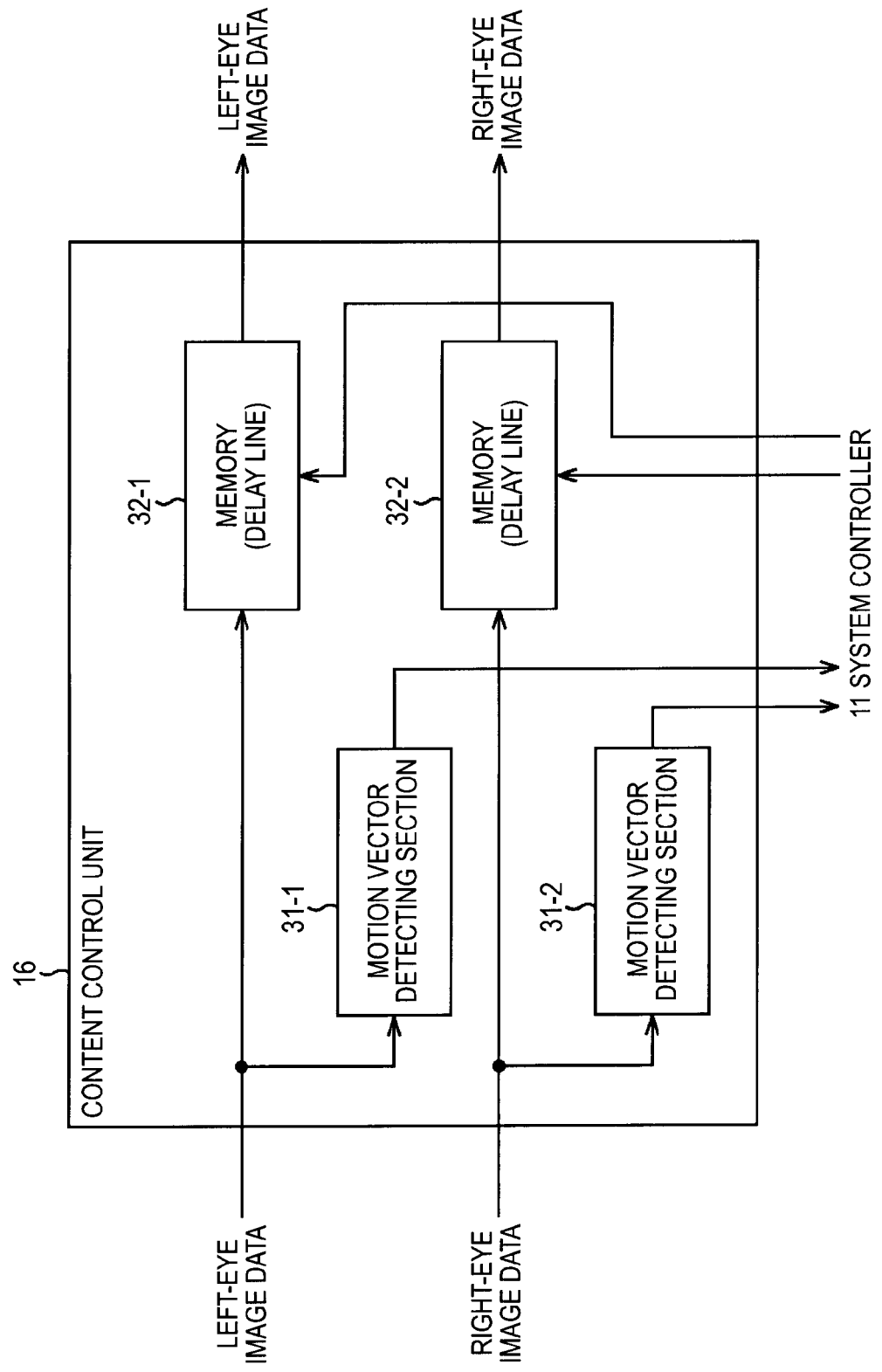

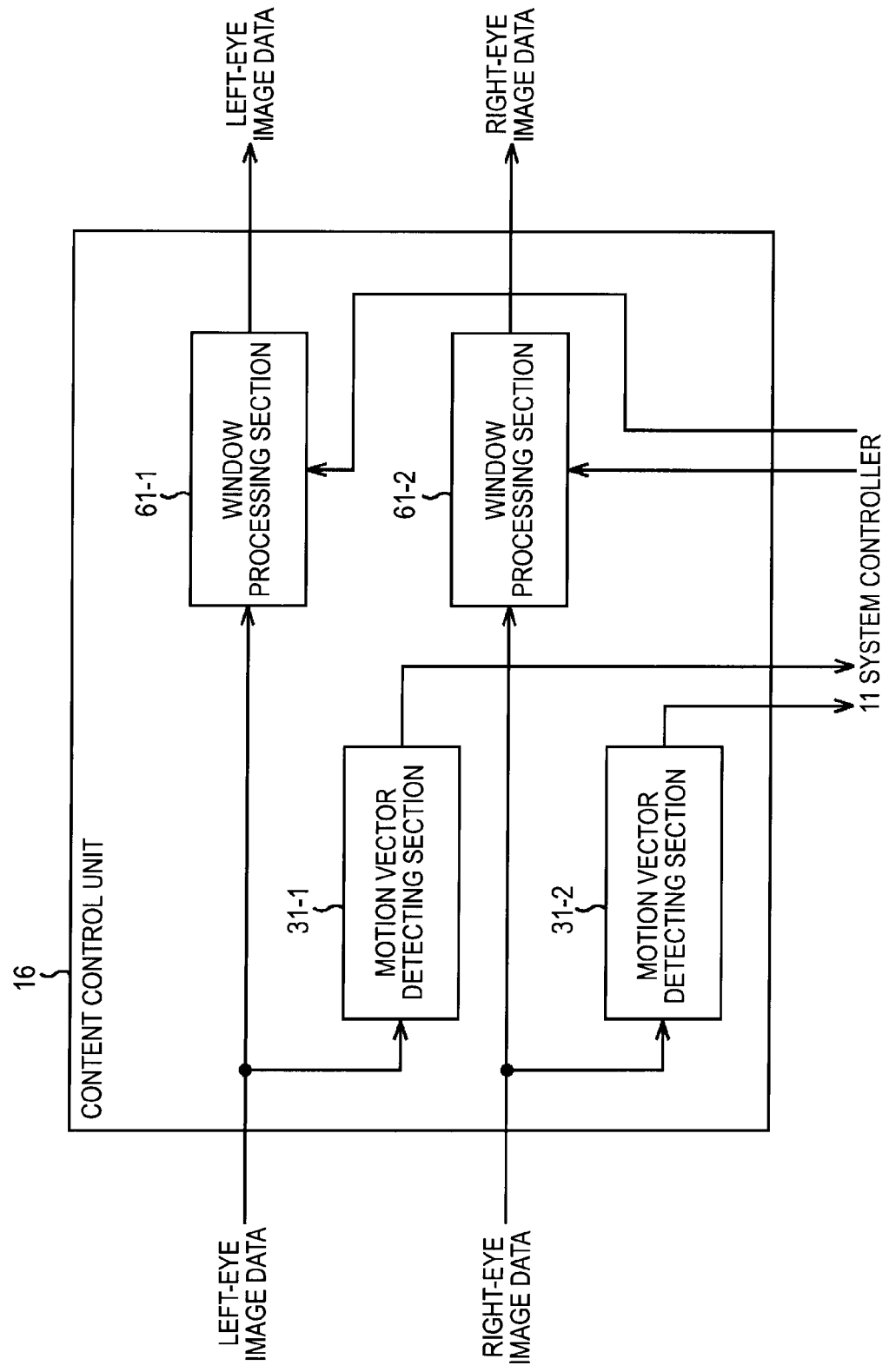

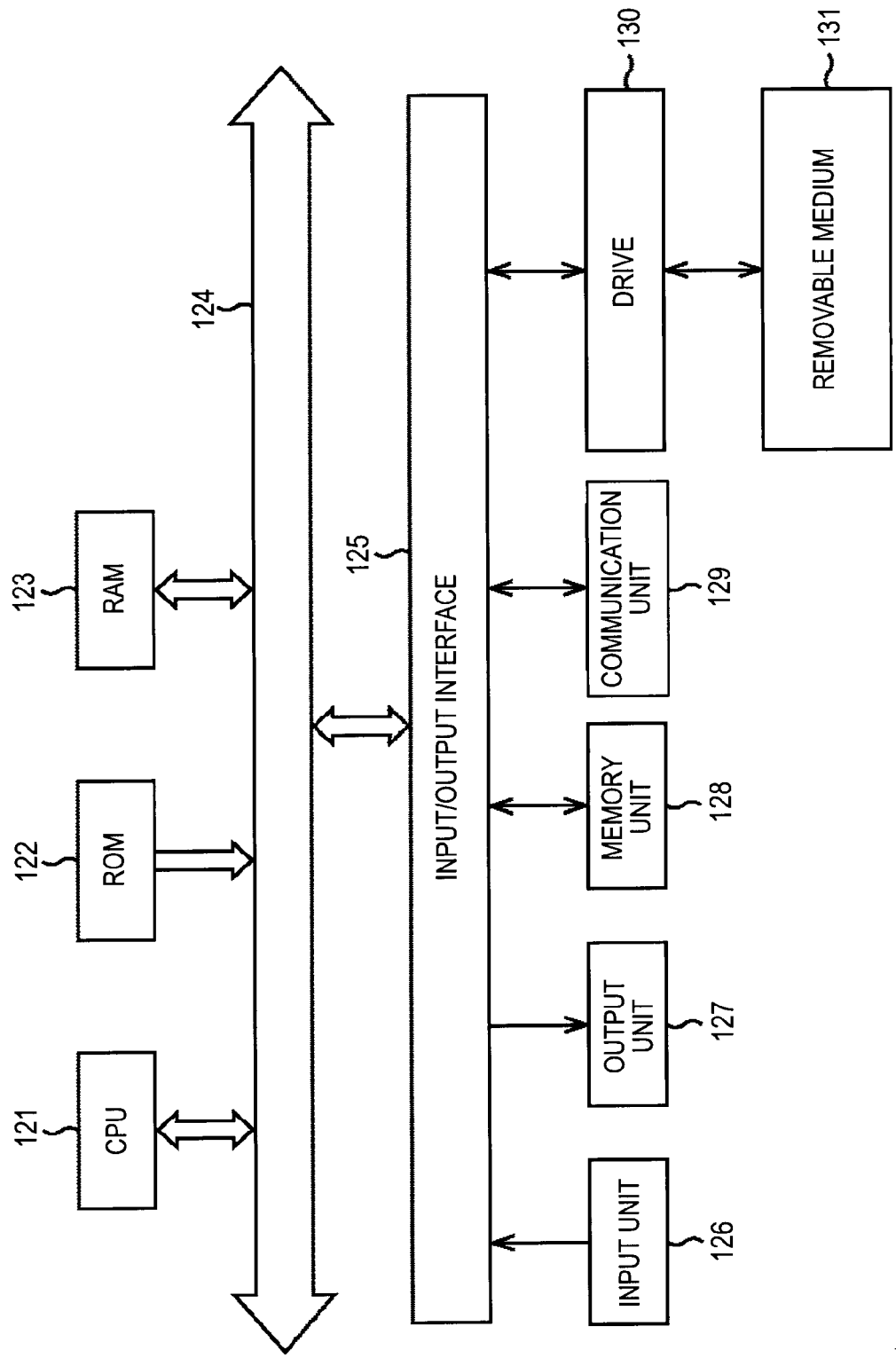

INFORMATION PROCESSING APPARATUS, INFORMATION PROCESSING METHOD, DISPLAY CONTROL APPARATUS, DISPLAY CONTROL METHOD, AND PROGRAM

CROSS REFERENCE TO RELATED APPLICATION

This application claims the benefit of priority under 35 U.S.C. §119 from Japanese Priority Patent Application JP 2009-260659 filed in the Japan Patent Office on Nov. 16, 2009, the entire contents of which is hereby incorporated by reference.

BACKGROUND OF THE INVENTION

1. Field of the Invention

The present invention relates to an information processing apparatus, an information processing method, a display control apparatus, a display control method, and a program, and more particularly, to an information processing apparatus, an information processing method, a display control apparatus, a display control method, and a program capable of reducing fatigue felt when variable speed reproduction of a content is performed.

2. Description of the Related Art

Recently, a 3D (three dimensional) display mode in which a viewer can stereoscopically recognize an image attracts attention as an image displaying mode that can be realized in accordance with an increase in the number of pixels of a display such as an LCD (Liquid Crystal Display) and the improvement of the frame rate.

Hereinafter, appropriately, an image that can be visually recognized stereoscopically is referred to as a 3D image, and a content including data of a 3D image is referred to as a 3D content. In addition, reproduction for displaying a 3D image is referred to as 3D reproduction. On the other hand, reproduction for displaying an ordinary 2D image (a planar image that is difficult to be stereoscopically recognized) is referred to as 2D reproduction.

As types for viewing 3D images, there are a glass-type that uses polarizing filter glasses or shutter glasses and a naked-eye type such as a lenticular type that does not use glasses. In addition, as a reproduction method for displaying a 3D image, there is a frame sequential method in which a left-eye image (L image) and a right-eye image (R image) having parallax from each other are alternately displayed. By transmitting the left-eye image and the right-eye image to the view's left and right eyes by using shutter glasses or the like, it is possible to allow the viewer to experience a stereoscopic effect.

Through such 3D images, realistic representations can be achieved, and accordingly, such 3D reproduction technologies are actively developed. In addition, technology for generating 3D contents based on contents (2D contents) used for ordinary 2D reproduction and displaying 3D images are developed. As a technique for generating 3D contents based on 2D contents, there is technology using parallax of images.

The characteristics of 3D images and 2D images are different from each other. Thus, in a case where a 3D image is watched for a long time, more fatigue may be accumulated, compared to a case where a 2D image is watched. In addition, a 3D image is felt to be more realistic than a general 2D image. Accordingly, a user may watch the content for a long time unintentionally.

Thus, fatigue may unexpectedly increase in a case where a 3D image is watched, compared to a case where an ordinary 2D image is watched. Accordingly, various technologies for reducing fatigue when a 3D image is watched are proposed.

SUMMARY OF THE INVENTION

Among recording apparatuses such as hard disk recorders, which are recently on the market, that record ordinary 2D contents, there are apparatuses that have a variable speed reproduction mode as a reproduction mode for contents that have been recorded. The variable speed reproduction indicates not reproduction at a normal speed, for example, at which 60-minute television program is reproduced for 60 minutes but reproduction at a speed that is higher or lower than the normal speed.

Such variable speed reproduction may be considered to be performed for 3D contents. 3D images can achieve more realistic representation than 2D images. Accordingly, in a case where a 3D image displayed by variable speed reproduction at a speed higher than the normal speed is viewed, more fatigue may be accumulated than in a case where a 2D image displayed by variable speed reproduction at the same speed is viewed.

Thus, it is desirable to reduce fatigue at a time when variable speed reproduction is performed for contents.

Accordingly to one exemplary embodiment of the present invention, a display apparatus is provided that determines a reproduction speed of a video, and sets a parallax parameter corresponding to the reproduction speed of the video. A content control unit then controls reproduction of the video based on the parallax parameter set by the system controller.

Such a configuration allows the parallax parameter to be set so as to coincide with the reproduction speed of the video, thereby fatigue at a time when variable speed reproduction of content is performed can be reduced.

BRIEF DESCRIPTION OF THE DRAWINGS

FIGS. 14A and 14B are diagrams representing another example of generation of a 3D image;

FIG. 15 is a block diagram representing a further another configuration example of the content control unit;

FIG. 16 is a block diagram representing a configuration example of the content control unit;

FIG. 21 is a block diagram representing a configuration example of hardware of a computer.

DESCRIPTION OF THE PREFERRED EMBODIMENTS

3D Image Display System

Figure 1:
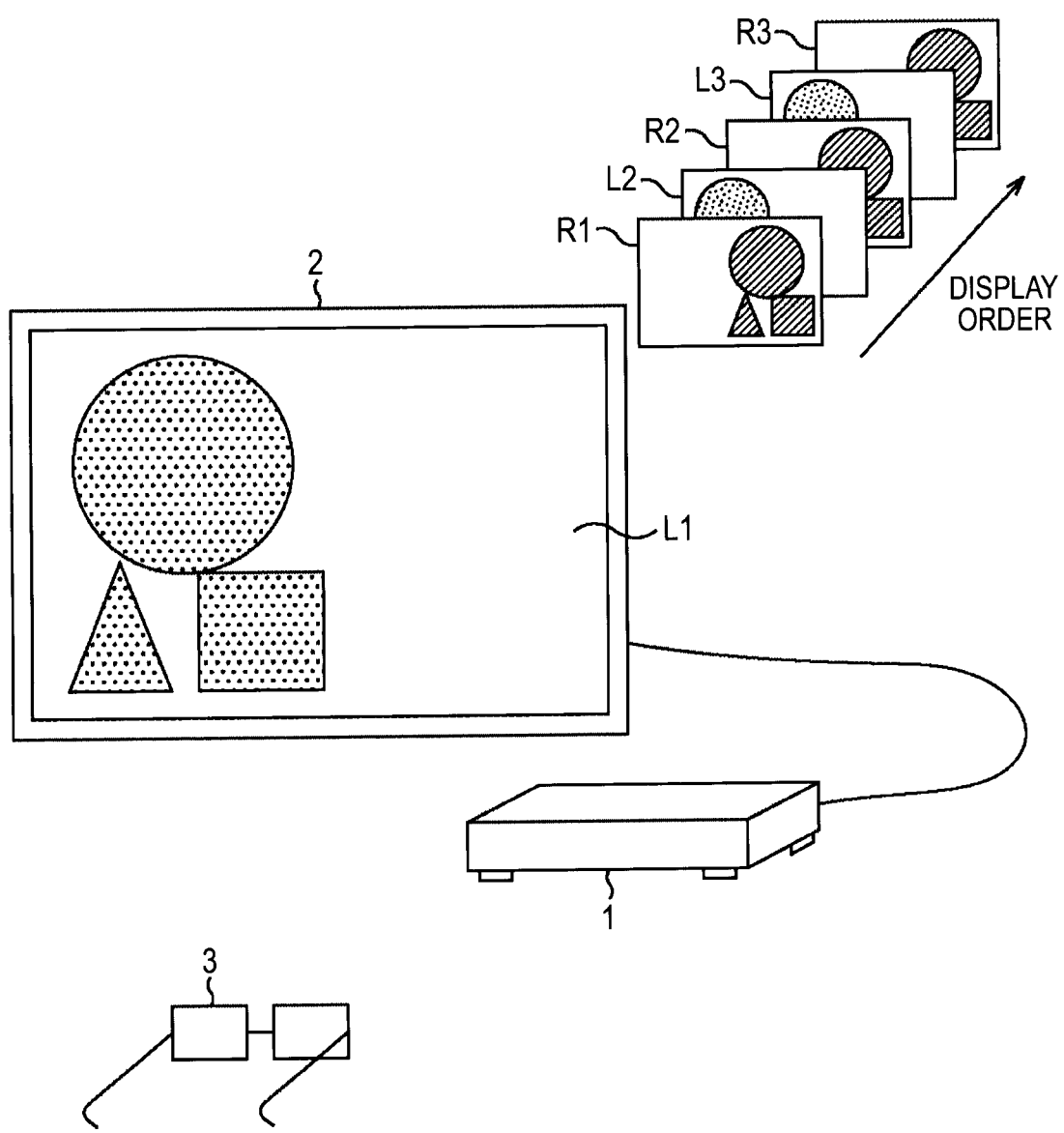
FIG. 1 is a diagram representing a configuration example of a 3D image display system according to an embodiment of the present invention.

FIG. 1 is a diagram representing a configuration example of a 3D image display system according to an embodiment of the present invention.

The 3D image display system shown in FIG. 1 is configured by a display control apparatus 1, a TV (television set) 2, and shutter glasses 3. In other words, the viewing type of a 3D image according to the 3D image display system shown in FIG. 1 is a type using glasses. The shutter glasses 3 are worn by a user who is a contents viewer.

The display control apparatus 1 reproduces content and displays an image (moving image) of the content on the TV 2. The display control apparatus 1, for example, reproduces a content that is recorded in a built-in HDD or a content that is recorded in a Blu-ray (trademark) disc inserted into a drive. The contents to be reproduced by the display control apparatus 1 are contents such as television programs and movies and include image data and audio data. The display control apparatus 1 and the TV 2 are connected to each other, for example, through a cable of an HDMI (High Definition Multimedia Interface) specification.

Here, a case where the image data included in the content to be reproduced is data for displaying an ordinary 2D image will be described.

The display control apparatus 1 generates 3D image data by converting 2D image data that is included in the content to be reproduced and displays the image of the content as a 3D image. Generation of 3D image data based on 2D image data will be described later.

In FIG. 1, a left-eye image L1 is displayed on the TV 2. Thereafter, as shown in the upper right side in FIG. 1, left-eye images and right-eye images are displayed in an alternating manner such as a right-eye image R1, a left-eye image L2, a right-eye image R2, a left-eye image L3, a right-eye image R3, . . . .

To the shutter glasses 3, a control signal that includes information on a vertical synchronization signal of an image is supplied from the display control apparatus 1, for example, through wireless communication using infrared rays. A left-eye transmission portion and a right-eye transmission portion of the shutter glasses 3 are configured by liquid crystal devices of which the polarization characteristics can be controlled.

The shutter glasses 3 alternately repeat two shutter opening/closing operations including an operation of opening the left eye and closing the right eye and an operation of closing the left eye and opening the right eye in accordance with a control signal. As a result, only a right-eye image is input to the user's right eye, and only a left-eye image is input to the left eye. By alternately viewing the left-eye image and the right-eye image, a user recognizes an image of the content as a stereoscopic image.

As described above, in the display control apparatus 1, a 3D reproduction mode is provided as a reproduction mode of the content.

In addition, in the display control apparatus 1, variable speed reproduction modes are provided as reproduction modes of the content. For example, a user can set the speed to 1.1 times speed, 1.2 times speed, 1.3 times speed, 1.4 times speed, 1.5 times speed, or the like that has a multiplication of speed higher than 1.0 times speed that is a normal speed.

In a case where variable speed reproduction is performed in accordance with the user's settings, the display control apparatus 1 controls the parallax between the left-eye image and the right-eye image by adjusting a parallax parameter in accordance with the reproduction speed. The parallax parameter is a parameter that defines the magnitude of the parallax between the left-eye image and the right-eye image. Changing the parallax between the left-eye image and the right-eye image, changes the stereoscopic effect (depth effect) experienced by a user viewing the 3D image.

Hereinafter, it is assumed that the value of the parallax parameter is in proportion to the parallax. The greater the value of the parallax parameter, the wider the wider parallax between the left-eye image and the right-eye image becomes, and a user viewing the left-eye image and the right-eye image experiences a subject more stereoscopically.

Figure 2:
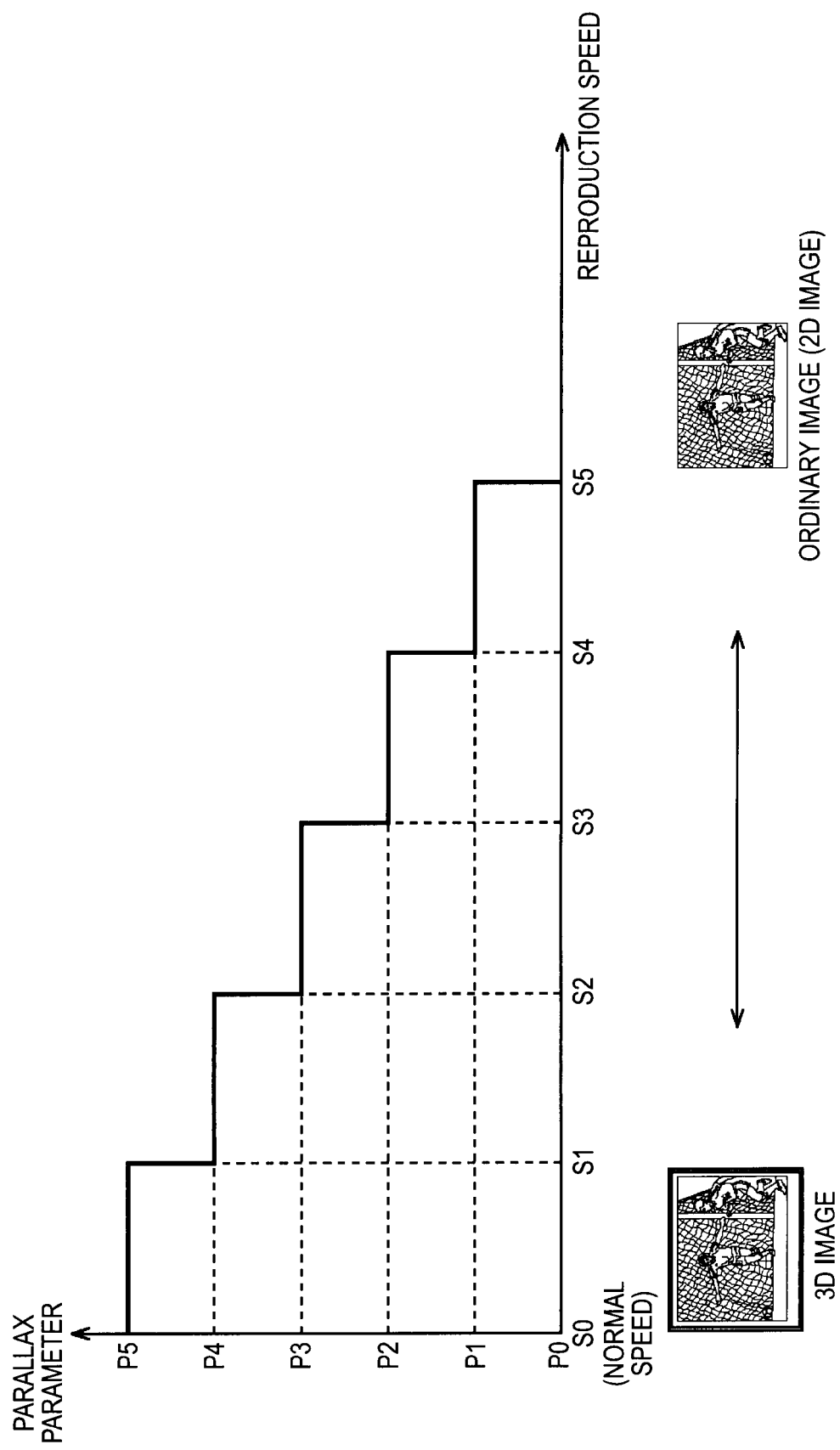
FIG. 2 is a diagram representing an example of the relationship between the reproduction speed and the parallax parameter.

FIG. 2 is a diagram representing an example of the relationship between the reproduction speed and the parallax parameter.

In FIG. 2, the horizontal axis represents the reproduction speed, and the vertical axis represents the parallax parameter. The reproduction speed becomes higher toward the right side with the normal speed used as a reference.

In the example shown in FIG. 2, when the reproduction speed is equal to or higher than S0 times the normal speed and lower than S1 times the normal speed, a value P5 that is a maximum value in the settable range of the parallax parameter is used for displaying a 3D image. In other words, when the reproduction speed is equal to or higher than S0 and lower than S1, a user can experience a subject the most stereoscopically.

In addition, when the reproduction speed is equal to or higher than S1 and lower than S2, a value P4, which is smaller than the value P5 by a predetermined value, is used as the value of the parallax parameter for displaying a 3D image. Similarly, when the reproduction speed is equal to or higher than S2 and lower than S3, a value P3, which is smaller than the value P4 by a predetermined value, is used as the value of the parallax parameter. When the reproduction speed is equal to or higher than S3 and lower than S4, a value P2, which is smaller than the value P3 by a predetermined value, is used as the value of the parallax parameter. On the other hand, when the reproduction speed is equal to or higher than S4 and lower than S5, a value P1, which is smaller than the value P2 by a predetermined value, is used as the value of the parallax parameter.

When the reproduction speed is equal to or higher than S5, a value P0 that is smaller than the value P1 by a predetermined value and is a minimum value in the settable range is used as the value of the parallax parameter. The value P0 of the parallax parameter indicates that the parallax between the left-eye image and the right-eye image is zero. In such a case, any one of the left-eye image and the right-eye image may be configured to be displayed. When the value P0 is set as the value of the parallax parameter, a user views a 2D image and does not experience a subject stereoscopically.

Here, for example, the reproduction speeds S1 to S5 corresponds to 1.1 times speed, 1.2 times speed, 1.3 times speed, 1.4 times speed, and 1.5 times speed.

The fatigue felt by continuously viewing a 3D image is higher than that felt by continuously viewing a 2D image. In addition, the fatigue felt by viewing content at a high reproduction speed is higher than that felt by viewing the content at a low reproduction speed. Accordingly, in a case where the reproduction speed is high, the fatigue felt by a user at the time of variable speed reproduction of a 3D content can be alleviated by reproducing the content such that the subject is not experienced as less stereoscopic than in a case where the reproduction speed is low.

[Configuration of Display Control Apparatus 1]

Figure 3:
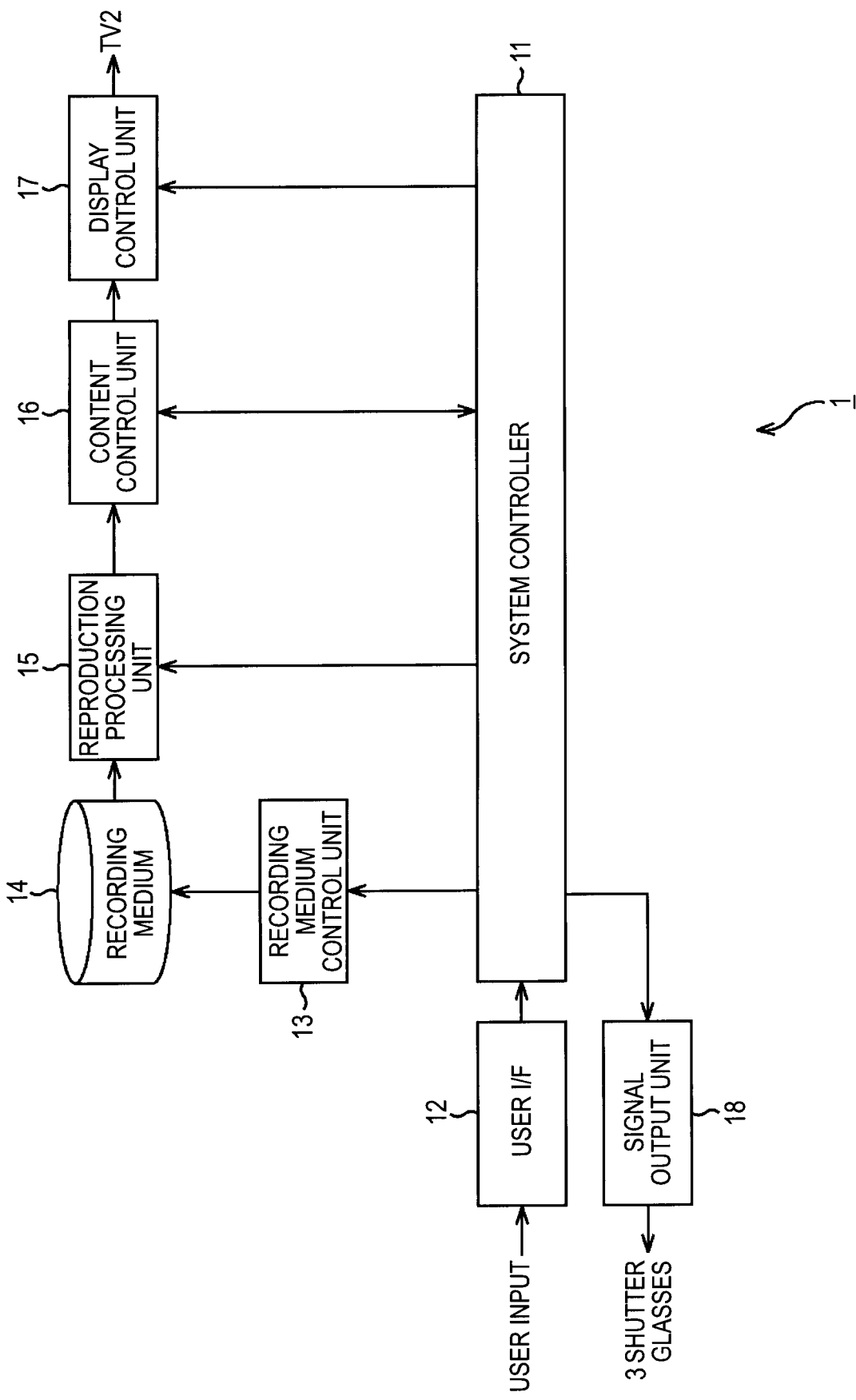
FIG. 3 is a block diagram representing a configuration example of the display control apparatus.

FIG. 3 is a block diagram representing a configuration example of the display control apparatus 1.

A system controller 11 controls the overall operation of the display control apparatus 1 in accordance with a signal representing the content of a user's operation that is supplied from a user I/F 12.

For example, the system controller 11 adjusts the reproduction speed of content by controlling a reproduction processing unit 15. In addition, the system controller 11 adjusts the parallax between the left-eye image and the right-eye image to be in correspondence with the reproduction speed of the content by controlling a content control unit 16.

The user I/F 12 is configured by a light sensing unit that receives a signal transmitted from a remote controller and the like. The user I/F 12 detects a user's operation for a remote controller and outputs a signal representing the content to the system controller 11.

A recording medium control unit 13 controls to record content on a recording medium 14 and read content from the recording medium 14. The recording medium 14, for example, is an HDD (Hard Disk Drive) and records contents.

In addition, the recording medium control unit 13 receives a broadcasted content based on a signal transmitted from an antenna not shown in the figure and records the content on the recording medium 14. When a specific content is selected from among the contents recorded on the recording medium 14 by a user and the recording medium control unit 13 is directed to reproduce the selected content, the recording medium control unit 13 supplies the content directed to be reproduced from the recording medium 14 to the reproduction processing unit 15.

The reproduction processing unit 15 performs a reproduction process such as a decoding process that decompresses compressed data of the content, which is supplied from the recording medium 14, to be reproduced. The speed of the reproduction process performed by the reproduction processing unit 15 is controlled by the system controller 11. The reproduction processing unit 15 outputs image data acquired by reproducing the content to the content control unit 16. The audio data that is used for outputting audio in accordance with an image of the content is output to an external speaker or the like from the reproduction processing unit 15 through a circuit not shown in the figure.

When a 3D image is to be displayed, the content control unit 16 generates a left-eye image and a right-eye image based on the data of a 2D image that is supplied from the reproduction processing unit 15 and outputs data of the left-eye image and the right-eye image that have been generated to the display control unit 17. On the other hand, when a 2D image is to be displayed based on the reproduction speed that is higher than S5 shown in FIG. 2 that is a threshold value, the content control unit 16 outputs the data of the 2D image, which is supplied from the reproduction processing unit 15, to a display control unit 17.

The display control unit 17 outputs the data of the left-eye image and the right-eye image as data of a 3D image or the data of a 2D image that is supplied from the content control unit 16 to the TV 2 so as to display an image.

A signal output unit 18 transmits a control signal supplied from the system controller 11 to the shutter glasses 3. When a 3D image is to be displayed on the TV 2, a control signal for operating the shutter of the shutter glasses 3 in accordance with display timings of the left-eye image and the right-eye image is supplied from the system controller 11.

In the shutter glasses 3 that have received the control signal transmitted from the signal output unit 18, the shutter operations of the left-eye transmission portion and the right-eye transmission portion are controlled.

Figure 4:
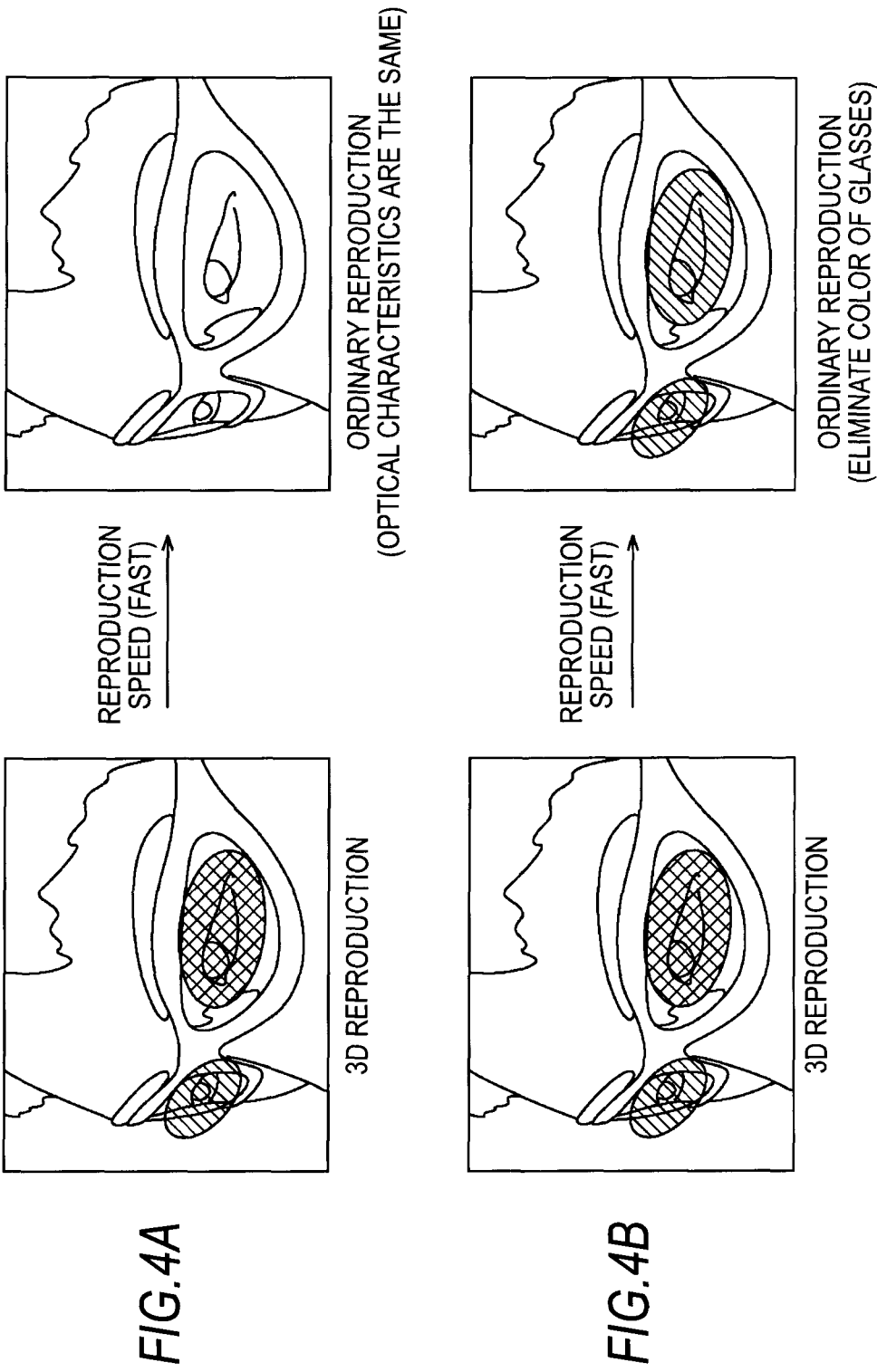
FIGS. 4A and 4B are diagrams representing the states of shutter glasses.

FIGS. 4A and 4B are diagrams representing examples of control of the shutter glasses 3.

When the reproduction speed of the content is higher than the threshold value, and thus a 2D image is displayed, a control signal for allowing the characteristics (the shutter operations) of the left-eye transmission portion and the right-eye transmission portion to be the same is transmitted from the display control apparatus 1 to the shutter glasses 3.

In FIG. 4A, a left image represents the state of the shutter glasses 3 for a case where the characteristics of the left and right transmission portions of the shutter glasses 3 are different from each other (timings of closing and opening are different). In such a state, a left-eye image arrives at the left eye, and a right-eye image arrives at the right eye. On the other hand, a right image in FIG. 4A represents the state of the shutter glasses 3 for a case where the characteristics of the left and right transmission portions of the shutter glasses 3 are the same (timings of closing and opening are the same). In such a state, the image displayed on the TV 2 simultaneously arrives at the right eye and the left eye.

In addition, 3D display may be implemented by using a color filter mode in which images of which the colors are changed are viewed by a user as a right-eye image and a left-eye image. In such a case, glasses having the transmission portions of which the colors can be controlled, for example, such that the left-eye transmission portion is red, and the right-eye transmission portion is blue are used.

A left image in FIG. 4B represents the state of the glasses for a case where the characteristics of the left-eye transmission portion and the right-eye transmission portion are different from each other (colors to be transmitted are different). In addition, a right image in FIG. 4B represents the state of the glasses for a case where the characteristics of the left and right transmission portions are the same (colors to be transmitted are the same). By changing the characteristic of the glasses to be in the state represented on the right side in FIG. 4B at a time when the reproduction speed of the content becomes higher than the threshold value, a user views the image of the content reproduced at a high speed as a 2D image.

Figure 5:
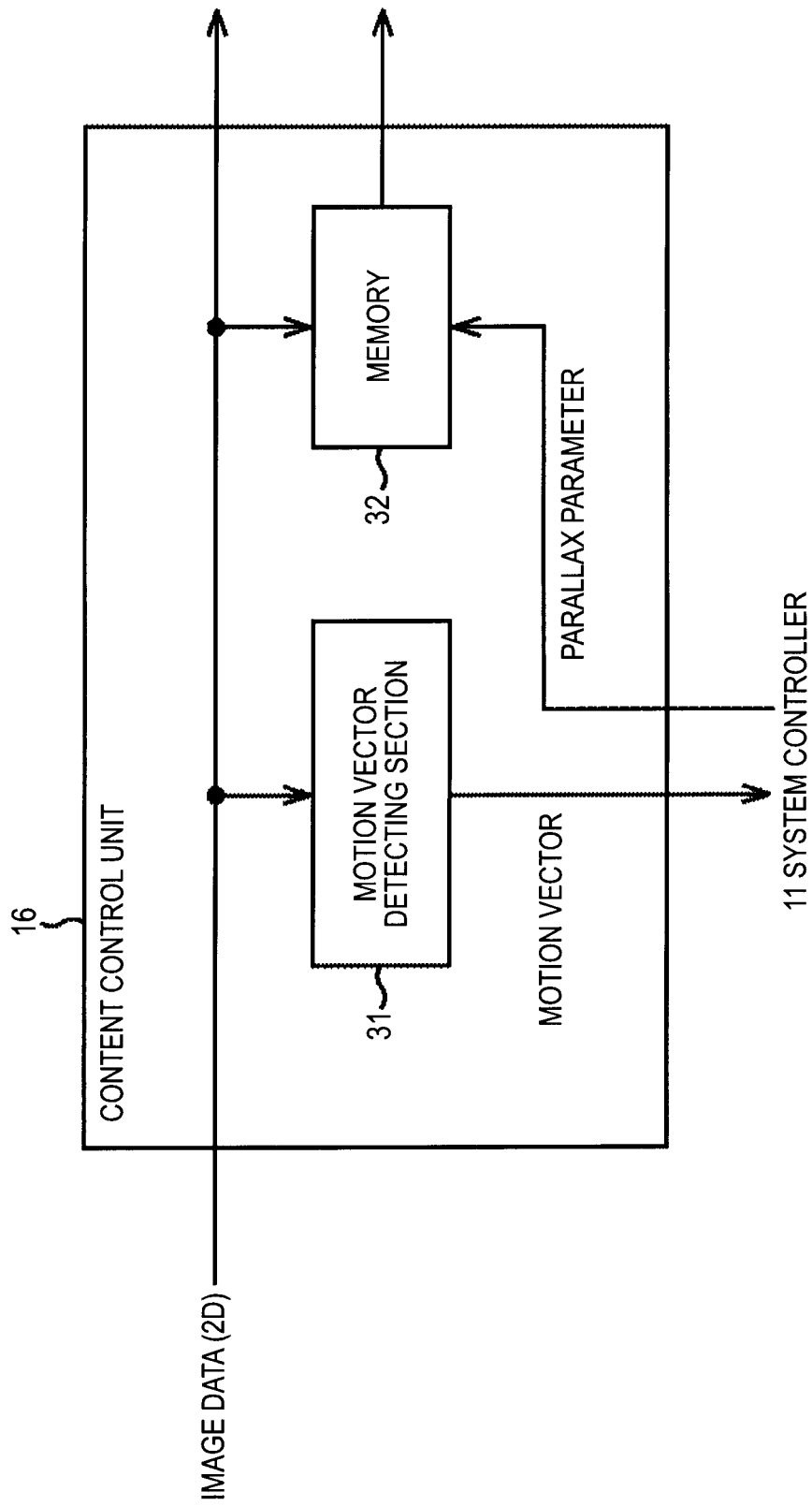
FIG. 5 is a block diagram representing a configuration example of a content control unit.

FIG. 5 is a block diagram representing a configuration example of the content control unit 16 shown in FIG. 3.

As shown in FIG. 5, the content control unit 16 is configured by a motion vector detecting section 31 and a memory 32. The data of a 2D image that is output from the reproduction processing unit 15 is input to the motion vector detecting section 31 and the memory 32 and is directly output to the display control unit 17. The data of the 2D image that is directly output from the content control unit 16 is used, for example, as data of a left-eye image in a case where a 3D image is displayed. In addition, the data of the 2D image is used for display in a case where a 2D image is displayed.

The motion vector detecting section 31 detects a motion vector that represents a motion between frames based on the input image data and outputs the motion vector to the system controller 11. The motion vector detecting section 31 detects motion vectors for each area that is configured by dividing one frame into a predetermined number of parts and detects the average of the motion vectors detected for each area as a motion vector that represents a motion between frames. In the system controller 11, the amount of delay of the memory 32 is controlled in accordance with the magnitude of the horizontal component of the motion vector detected by the motion vector detecting section 31.

When a 3D image is displayed, the memory 32 temporarily stores the input image data, delays the input image data by an amount of delay that is represented by the parallax parameter supplied from the system controller 11, and outputs the delayed input image data. The image data that is output from the memory 32 is used as the data of a right-eye image.

A user who views the left-eye image and the right-eye image output as a 3D image from the content control unit 16 having the above-described configuration experiences the subject stereoscopically based on a time difference between the left and right images. As a phenomenon that is similar to a phenomenon in which a subject is experienced as stereoscopic based on the time difference between the left and right images, a Mach-Dvorak phenomenon is known. The time difference between display of the left-eye image and display of the right-eye image becomes the parallax.

In addition, conversion of 2D image data into 3D image data, for example, is described in JP-A-7-222203. The configuration shown in FIG. 5 is basically the same as that described in JP-A-7-222203.

Figure 6:
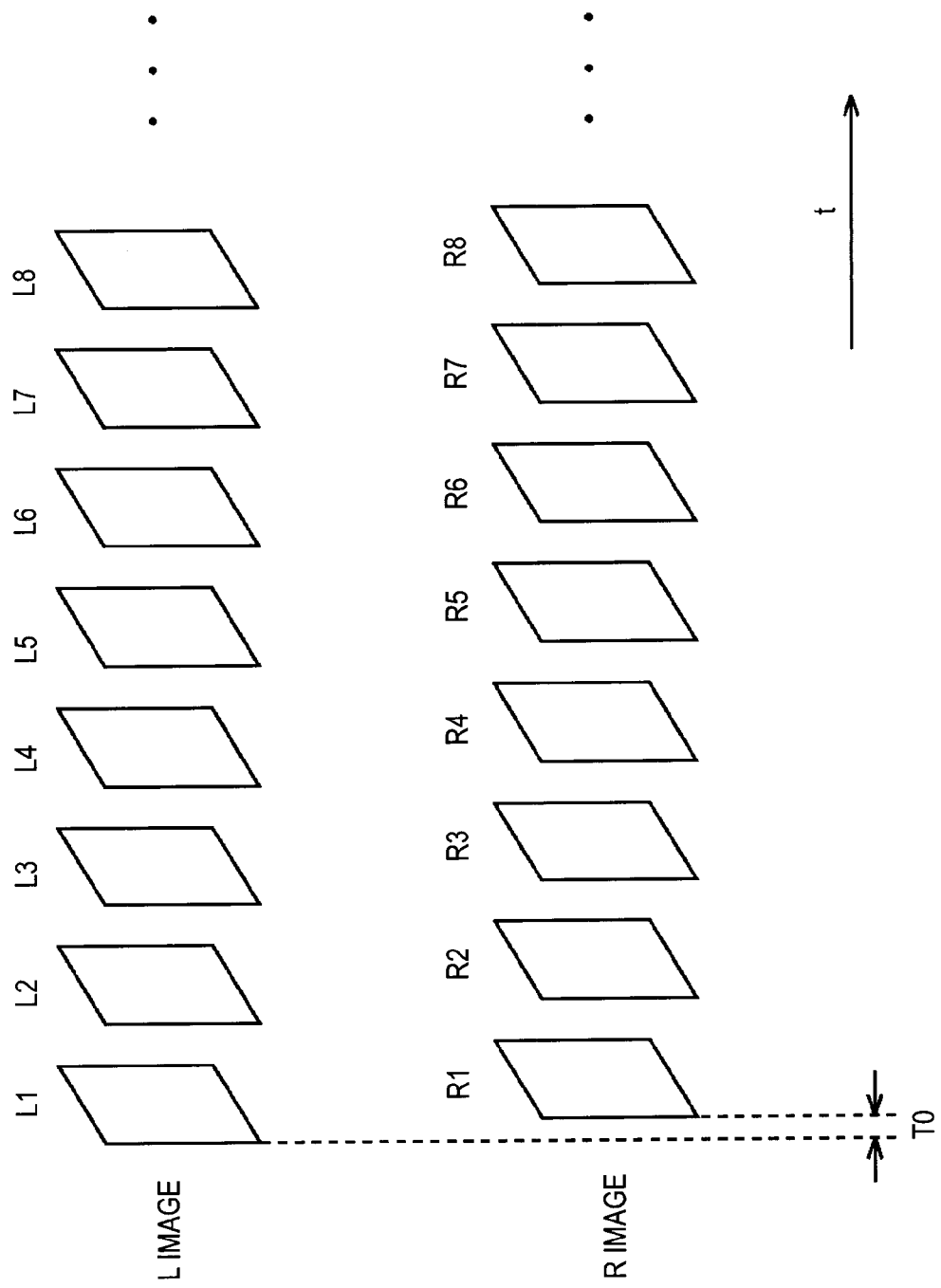
FIG. 6 is a diagram representing an example of generation of a 3D image.

FIG. 6 is a diagram illustrating the amount of delay of a display timing of a right-eye image with respect to a display timing a left-eye image.

For example, the amount of delay T0 is associated with the magnitude V0 of the horizontal component of a motion vector that becomes a reference in a case where the reproduction speed is the normal speed. When the magnitude of the horizontal component of the detected motion vector is V0, T0 is selected as the amount of delay, and, as shown in FIG. 6, the right-eye image R1 is displayed at a timing delayed by T0 with respect to that of the left-eye image L1.

In a case where the reproduction speed is the normal speed, when the magnitude of the horizontal component of the detected motion vector is V1 that is larger than V0, T1 that is the amount of delay smaller than T0 is selected so as to control the amount of delay of the memory 32. On the other hand, when the magnitude of the horizontal component of the detected motion vector is V2 that is smaller than V0, T2 that is the amount of delay larger than T0 is selected so as to control the amount of delay of the memory 32.

In the system controller 11, as described above, the magnitude of the horizontal component of the motion vector and the amount of delay are managed so as to be associated with each other. Accordingly, the amount of delay is controlled for each frame.

The amount of delay for a case where the reproduction speed exceeds the normal speed, for example, is an amount of delay that is acquired by multiplying the amount of delay at the normal speed by a coefficient k that is smaller than one. For example, in a case where the reproduction speed is the 1.1 times speed, when the magnitude of the horizontal component of the detected motion vector is V0, kT0 is selected as the amount of delay. Accordingly, the right-eye image is displayed at a timing delayed by kT0 with respect to that of the left-eye image. The coefficient k becomes a smaller value as the reproduction speed becomes higher.

A value that is smaller as the reproduction speed becomes higher is used as the coefficient k. Accordingly, as the reproduction speed becomes higher, a difference between the display timings of the left-eye image and the right-eye image is decreased, and the stereoscopic effect experienced by a user viewing the images is decreased.

Figure 7:
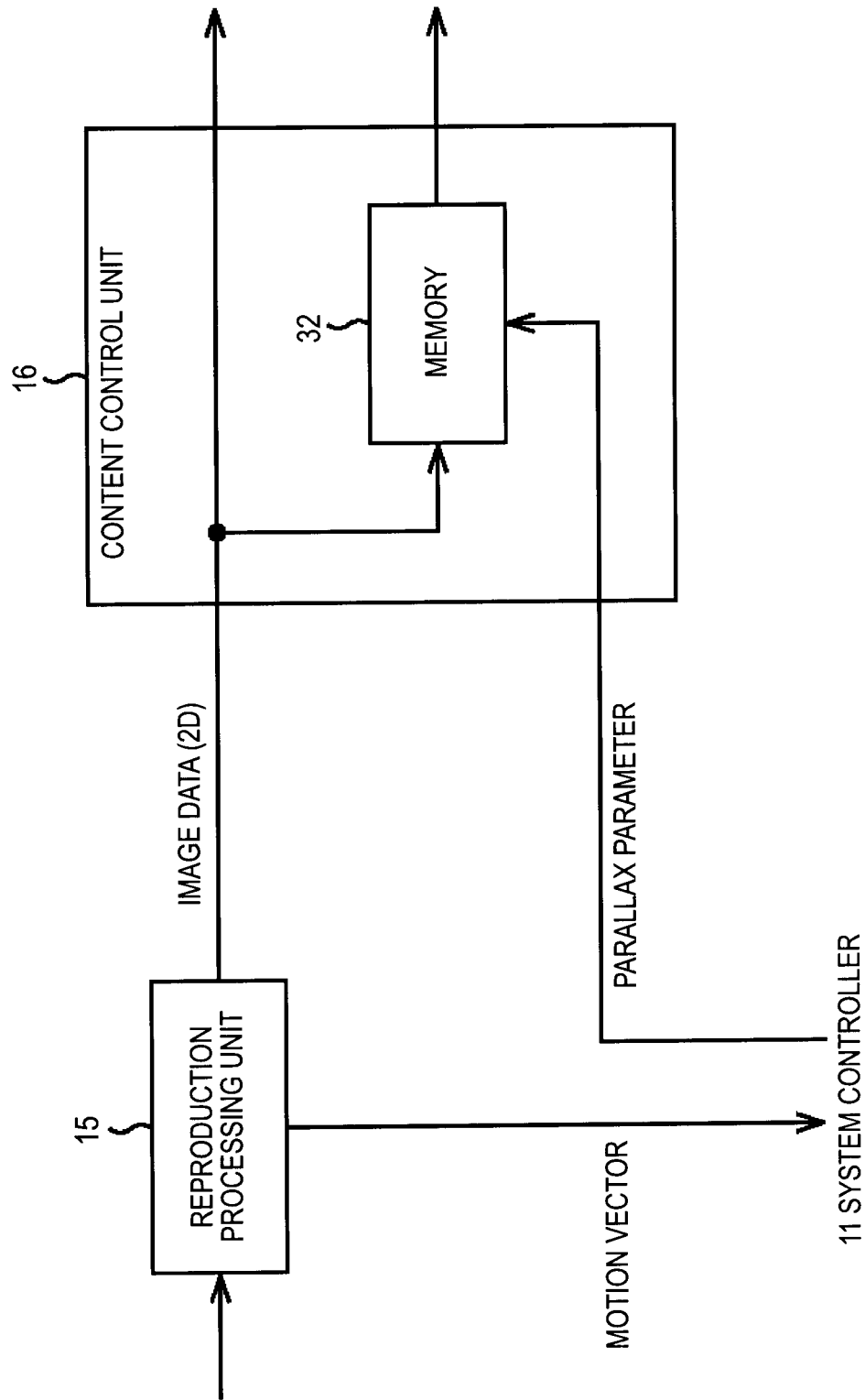
FIG. 7 is a block diagram representing another configuration example of the content control unit.

FIG. 7 is a block diagram representing another configuration example of the content control unit 16.

In this example, a configuration for detecting a motion vector is not disposed in the content control unit 16, and information on a motion vector that becomes a reference for controlling the amount of delay of the memory 32 is supplied to the system controller 11 from the reproduction processing unit 15. In a case where the compression method of image data input to the reproduction processing unit 15 is MPEG (Moving Picture Experts Group) 2, H.264/AVC, or the like, the information on the motion vector is included in the image data.

The reproduction processing unit 15 outputs the information on the motion vector that is included in the input image data to the system controller 11 and outputs data of a 2D image acquired by performing a reproduction process to the content control unit 16. In the system controller 11, the amount of delay is determined based on the motion vector, and a parallax parameter that represents the determined amount of delay is supplied to the memory 32.

The data of the 2D image that is output from the reproduction processing unit 15 is input to the memory 32 and is directly output to the display control unit 17. The data of the 2D image that is directly output from the content control unit 16 is used as data of a left-eye image in a case where a 3D image is displayed. In addition, the data of the 2D image is used for display in a case where a 2D image is displayed.

In a case where a 3D image is displayed, the memory 32 temporarily stores the input image data, delays the image data by the amount of delay represented by the parallax parameter supplied from the system controller 11, and outputs the delayed image data. The image data that is output from the memory 32 is used as the data of a right-eye image.

[Operation of Display Control Apparatus 1]

Figure 8:
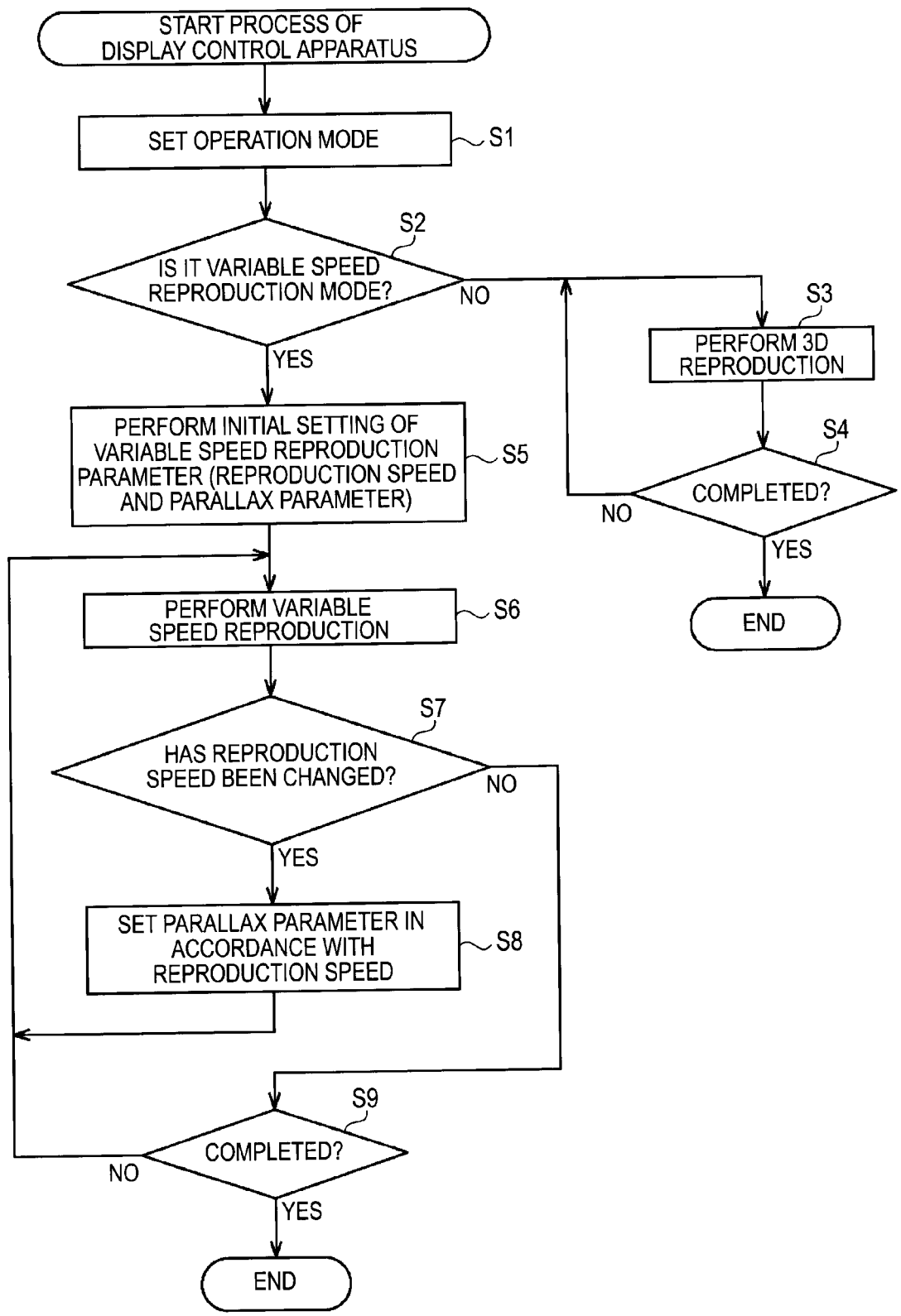
FIG. 8 is a flowchart illustrating the process of a display control apparatus.

The process of the display control apparatus 1 will be described with reference to a flowchart represented in FIG. 8.

In Step S1, the system controller 11 sets an operation mode in accordance with a user's operation. For example, when being directed to perform variable speed reproduction of a content that is recorded on a recording medium 14, the system controller 11 sets the variable speed reproduction mode as the operation mode.

In Step S2, the system controller 11 determines whether or not the set mode is the variable speed reproduction mode.

When it is determined that the set mode is not the variable speed reproduction mode in Step S2, the system controller 11 performs 3D reproduction at the normal speed by controlling each unit in Step S3. In other words, a left-eye image and a right-eye image are generated by the content control unit 16 based on the image data that is acquired by reproducing the content by using the reproduction processing unit 15. The data of the left-eye image and the right-eye image generated by the content control unit 16 is output to the TV 2 from the display control unit 17 so as to be used in displaying a 3D image.

In Step S4, the system controller 11 determines whether or not the reproduction of the content is completed. When the reproduction of the content is determined not to be completed, the process proceeds back to Step S3, and the system controller 11 resumes to perform 3D reproduction of the content. On the other hand, when the reproduction of the content is determined to be completed in Step S4, the process ends.

On the other hand, when the set mode is determined to be the variable speed reproduction mode in Step S2, the system controller 11 performs initial setting of the variable speed reproduction parameter in Step S5. The system controller 11 outputs information on the multiplication of the reproduction speed to the reproduction processing unit 15 and outputs a parallax parameter corresponding to the reproduction speed to the memory 32 of the content control unit 16.

In Step S6, the system controller 11 performs variable speed reproduction by controlling each unit. In other words, a left-eye image and a right-eye image that have parallax from each other are generated by the content control unit 16 based on the image data that is acquired by reproducing the content at a speed set by a user by using the reproduction processing unit 15. The data of the left-eye image and the right-eye image that is generated by the content control unit 16 is output from the display control unit 17 to the TV 2 so as to be used in displaying a 3D image.

In Step S7, the system controller 11 determines whether or not the reproduction speed has been changed.

When the reproduction speed is determined to have been changed in Step S7, the system controller 11 changes the reproduction speed by controlling the reproduction processing unit 15 and outputs a parallax parameter corresponding to the reproduction speed after the change to the content control unit 16, in Step S8. Thereafter, the process proceeds back to Step S6, and the variable speed reproduction is continued.

On the other hand, when the reproduction speed is determined not to have been changed in Step S7, the system controller 11 determines whether or not the reproduction of the content is completed in Step S9.

When the reproduction of the content is determined not to have been completed in Step S9, the process proceeds back to Step S6, and the system controller 11 resumes the variable speed reproduction of the content. On the other hand, when the reproduction of the content is determined to have been completed in Step S9, the process ends.

As described above, in a case where the reproduction speed is high, the content is reproduced such that a subject is experienced as less stereoscopic than in a case where the reproduction speed is low. Accordingly, the fatigue felt by a user at a time when the variable speed reproduction of a 3D content is performed can be reduced.

[Configuration of Display Control Apparatus 1]

Figure 9:
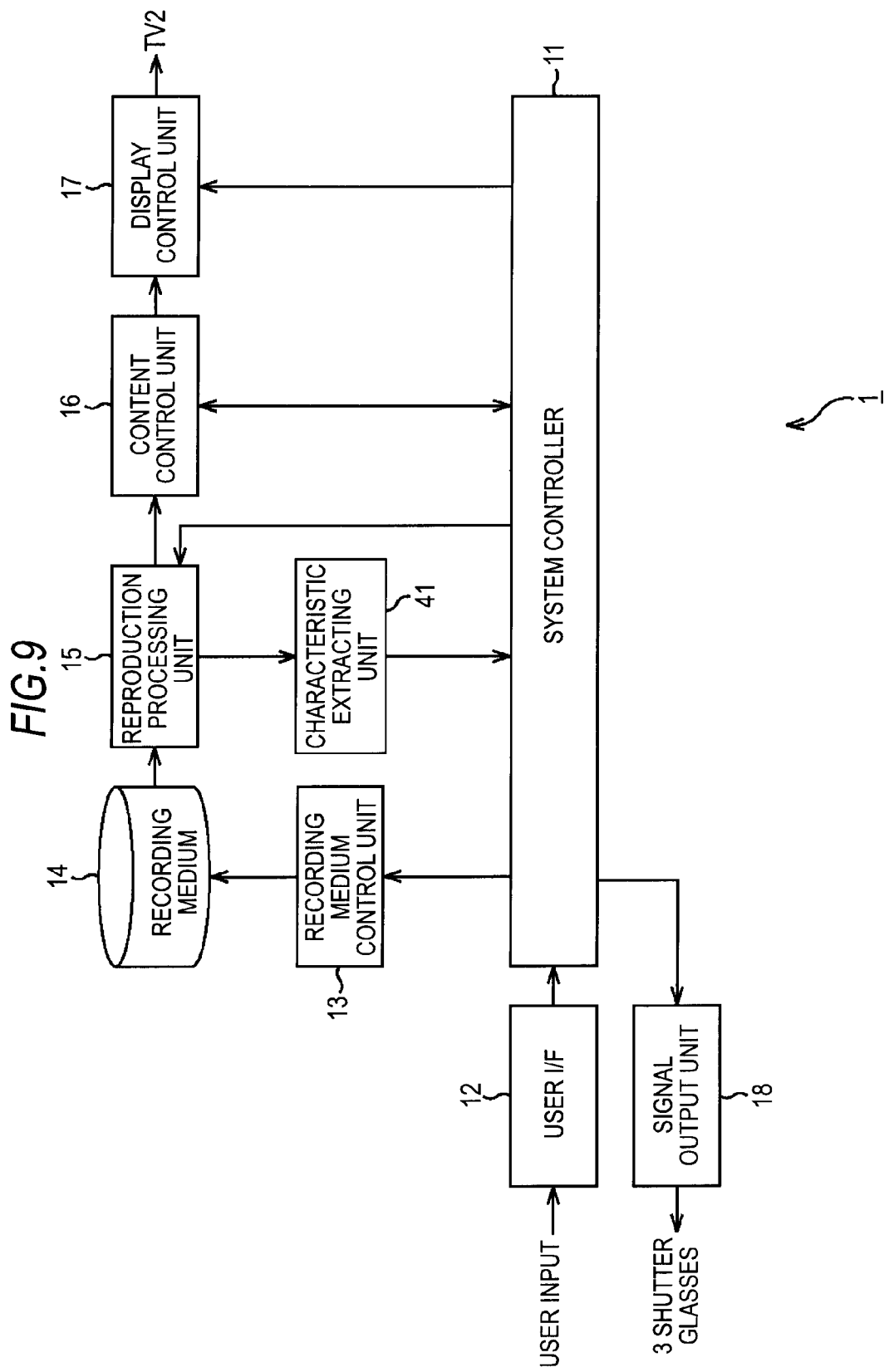
FIG. 9 is a block diagram representing another configuration example of the display control apparatus.

FIG. 9 is a block diagram representing another configuration example of the display control apparatus 1.

To each constituent element shown in FIG. 9 that is the same as that shown in FIG. 3, a same reference sign is assigned. In addition, duplicate description will be appropriately omitted. The configuration of the display control apparatus 1 shown in FIG. 9 is the same as that shown in FIG. 3 except for additional disposition of a characteristic extracting unit 41.

In the display control apparatus 1 shown in FIG. 9, an important section of a content, which is a television program, such as a climax is detected by analyzing the image data and the audio data of the content. In addition, the reproduction speed and the parallax between the left-eye image and the right-eye image are controlled based on whether or not the current reproduction position is a position within the important section or a position near the important section.

The reproduction processing unit 15 performs a reproduction process such as a decoding process that decompresses compressed data for the content, which is supplied from the recording medium 14, to be reproduced. The reproduction processing unit 15 outputs the image data and the audio data acquired by performing the reproduction process to the characteristic extracting unit 41 and outputs the image data used for displaying the image of the content to the content control unit 16.

The characteristic extracting unit 41 extracts the characteristics of the image data and the audio data that are supplied from the reproduction processing unit 15 and outputs characteristic data that represents the extracted characteristics to the system controller 11.

The system controller 11 detects an important section of the content based on the characteristic data that is supplied from the characteristic extracting unit 41. The system controller 11 controls the reproduction speed of the content and the parallax between the left-eye image and the right-eye image based on whether or not the current reproduction position is a position within the important section or a position near the important section.

Figure 10:
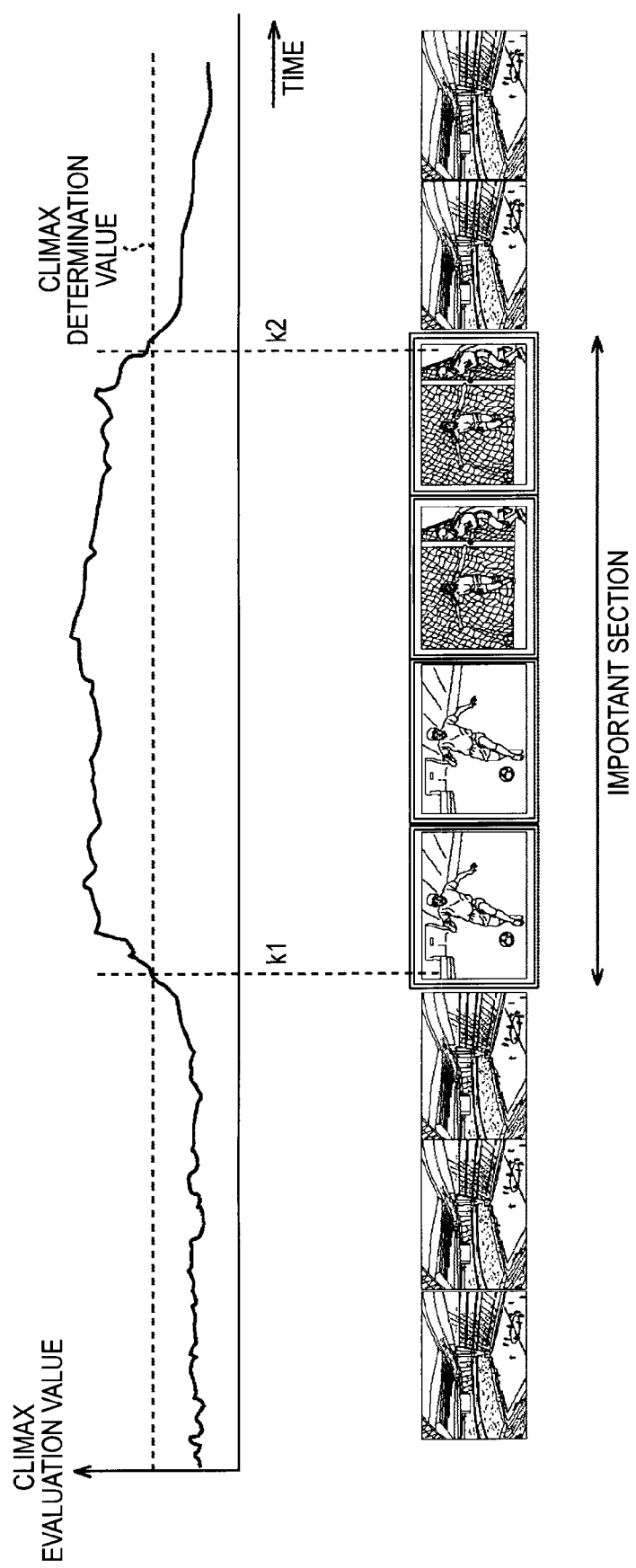
FIG. 10 is a diagram representing an example of detection of an important section.

FIG. 10 is a diagram representing an example of a change in the climax evaluation values of scenes and display of an image.

In the example represented in FIG. 10, the content to be reproduced is a soccer relay program. The soccer relay program, for example, is recorded on the recording medium 14. The image data and the audio data of the soccer relay program are analyzed (the characteristic thereof is extracted) at a predetermined time such as before start of reproduction or during reproduction.

The characteristic of the image data, for example, is the degree of zoom and pan. The degree of zoom and pan, for example, is detected by comparing pixel values of frames with each other. The characteristic of the audio data, for example, is the volume of sound.

The display control apparatus 1, for example, calculates a value that is acquired by adding a digitalized value of the characteristic extracted from the image data and a digitalized value of the characteristic extracted from the audio data as a climax evaluation value. The waveform shown on the upper side in FIG. 10 represents a change in the climax evaluation value for each unit time of the soccer relay program with the horizontal axis representing the time and the vertical axis representing the climax evaluation value. Alternatively, the climax evaluation value may be configured to be calculated based on one of the characteristics extracted from the image data and the characteristics extracted from the audio data.

The display control apparatus 1 compares the climax evaluation value of each time with a threshold value and detects a section in which the climax evaluation value equal to or greater than the threshold value is detected for a predetermined time or longer as a climax period, that is, an important section. In the example represented in FIG. 10, a section from time k1 to time k2 is detected as an important section.

Figure 11:
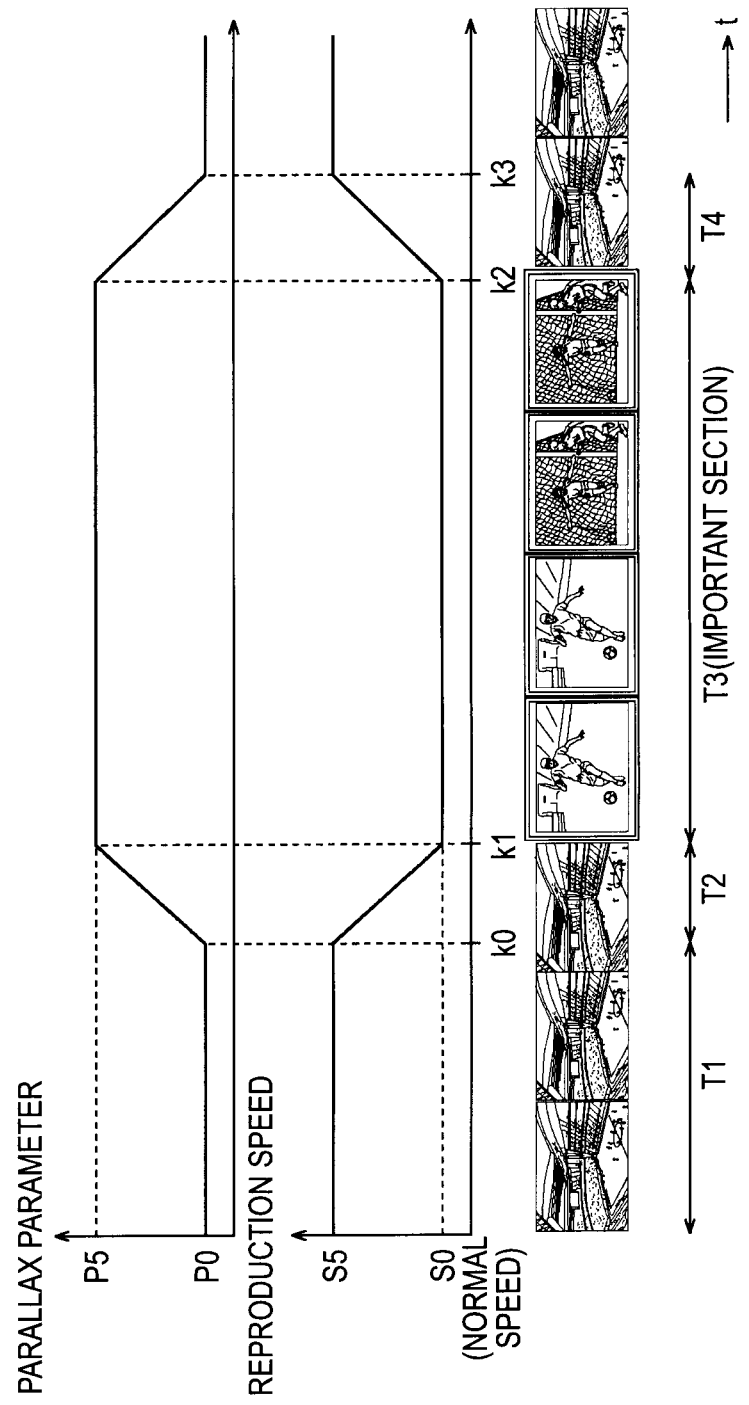
FIG. 11 is a diagram representing an example of the relationship between a reproduction speed and a parallax parameter.

FIG. 11 is a diagram representing an example of the relationship between the reproduction speed and the parallax parameter.

As shown in FIG. 11, in a section T1 from the start time of a content to time k0, reproduction is performed at a speed S5 that is higher than the normal speed. Here, time k0 is time a predetermined time before the start time k1 of an important section. In addition, in the section T1, a value P0 is used as the parallax parameter, and a 2D image is displayed.

A user views the 2D image of the content reproduced at a speed higher than the normal speed in the section T1.

In a section T2 from time k0 to time k1, reproduction is performed while the reproduction speed is linearly dropped from S5 to S0 in accordance with elapse of time. In addition, in the section T2, the value of the parallax parameter is linearly changed from a value P0 to a value P5 in accordance with elapse of time so as to display a left-eye image and a right-eye image.

A user views the image of the content that is reproduced slowly with the stereoscopic effect slowly increased in the section T2 that is prior to the important section.

In a section T3 from time k1 to time k2 of the important section, reproduction is performed at a speed S0 (normal speed) that is slower than those in the other sections. In addition, in the section T3, a value P5 is used as the parallax parameter, and a left-eye image and a right-eye image having the parallax that is larger than those in the other sections are displayed.

In the section T3 as an important section, a user views an image of the content reproduced at a normal speed with the subject experiences as more stereoscopic than in the other sections.

In a section T4 from time k2 to time k3, reproduction is performed while linearly increasing the reproduction speed from S0 to S5 in accordance with the elapse of time. In addition, in the section T4, the value of the parallax parameter is linearly changed from P5 to P0 in accordance with the elapse of time so as to display a left-eye image and a right-eye image.

In the section T4 that is a section after the important section, a user views an image of the content reproduced at a speed that is slowly increased with the stereoscopic effect thereof experienced as slowly decreased.

After time k3, similarly to the section T1, reproduction is performed at the speed S5 that is higher than the normal speed. In addition, after the time k3, P0 is used as the value of the parallax parameter, and a 2D image is displayed.

After the time k3, a user views a 2D image of the content reproduced at a speed higher than the normal speed.

As described above, the content is reproduced such that the reproduction speed is set to be higher than the normal speed in a section other than the important section, and the subject is configured not to be experienced as stereoscopic in the important section. Accordingly, the fatigue felt by a user at a time when the variable speed reproduction is performed for a 3D content can be reduced.

In addition, the reproduction speed is lowered in the important section so as to display an image in the form in which the subject can be felt to be the most stereoscopic. Accordingly, it is possible to highlight that the section in the middle of the reproduction process is the important section.

Furthermore, by slowly changing the reproduction speed and the parallax parameter in a section before or after the important section, a user can be accustomed to a change in the reproduction speed and a change in the stereoscopic effect.

In the example represented in FIG. 11, the content has been described to be reproduced at the normal speed within the important section. However, the reproduction may be performed at a speed higher than the normal speed as long as the speed is lower than the reproduction speed of the section T1 and the section after time k3. In addition, a 2D image has been described to be displayed in the section T1 and the section after time k3. However, it may be configured that a value that is smaller than the value P5 used in the important section is used as the parallax parameter, and a 3D image is displayed.

Figure 12:
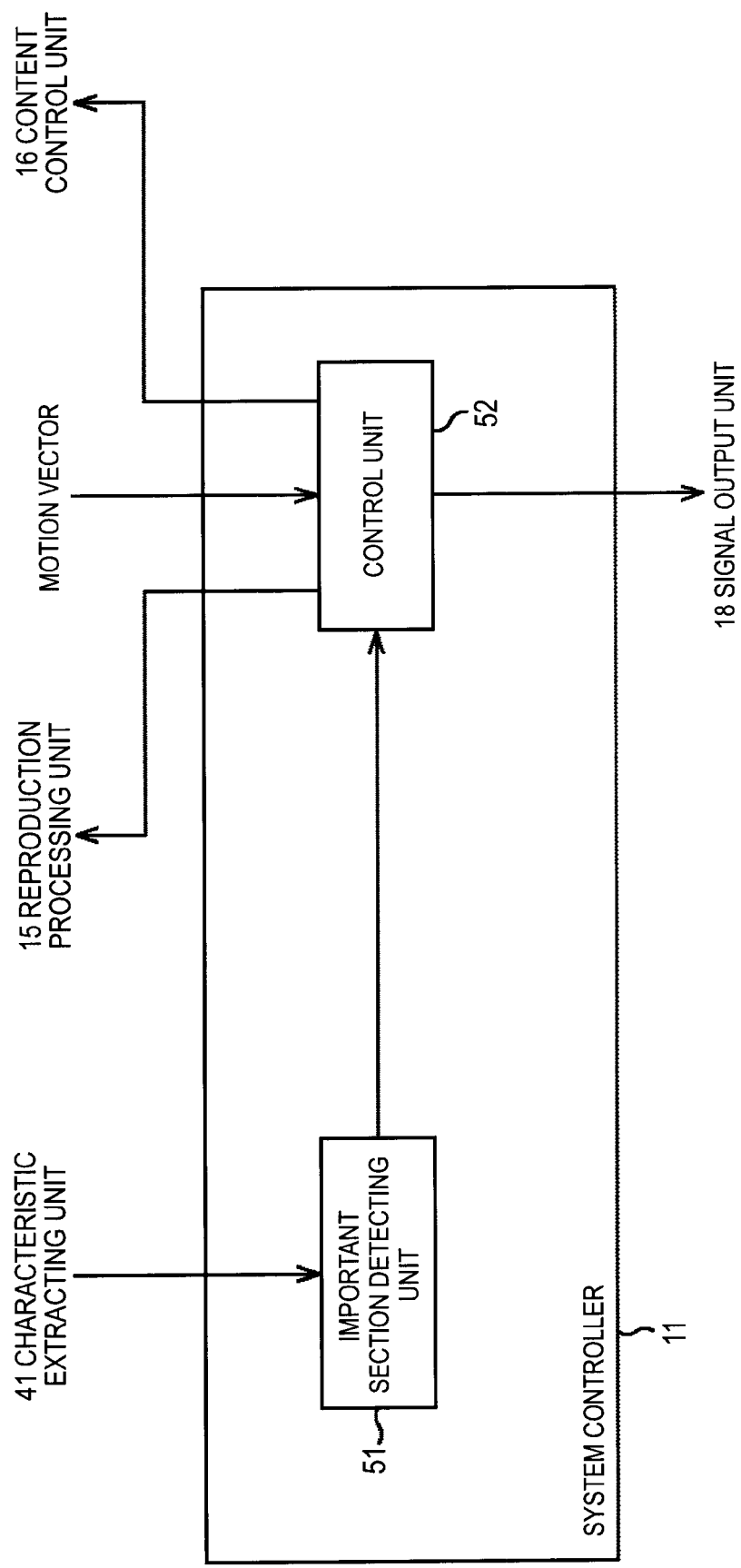
FIG. 12 is a block diagram representing a configuration example of a system controller.

FIG. 12 is a block diagram representing a configuration example of the system controller 11 shown in FIG. 9.

As shown in FIG. 12, the system controller 11 is configured by an important section detecting unit 51 and a control unit 52. The characteristic data output from the characteristic extracting unit 41 is input to the important section detecting unit 51. The information on the motion vector that is output from the motion vector detecting section 31 (FIG. 5) of the content control unit 16 or the reproduction processing unit 15 (FIG. 7) is input to the control unit 52.

The important section detecting unit 51 detects the important section by calculating evaluation values based on the characteristics of the image data and the audio data, as described with reference to FIG. 10. The important section detecting unit 51 outputs information representing the important section to the control unit 52.

The control unit 52 monitors the current position of reproduction during the reproduction process of the content and controls the reproduction speed of the content and the parallax parameter in accordance with the current position of reproduction as described with reference to FIG. 11. In addition, the control unit 52 controls the characteristic of the shutter glasses 3 by outputting a control signal to the signal output unit 18.

[Operation of Display Control Apparatus 1]

Figure 13:
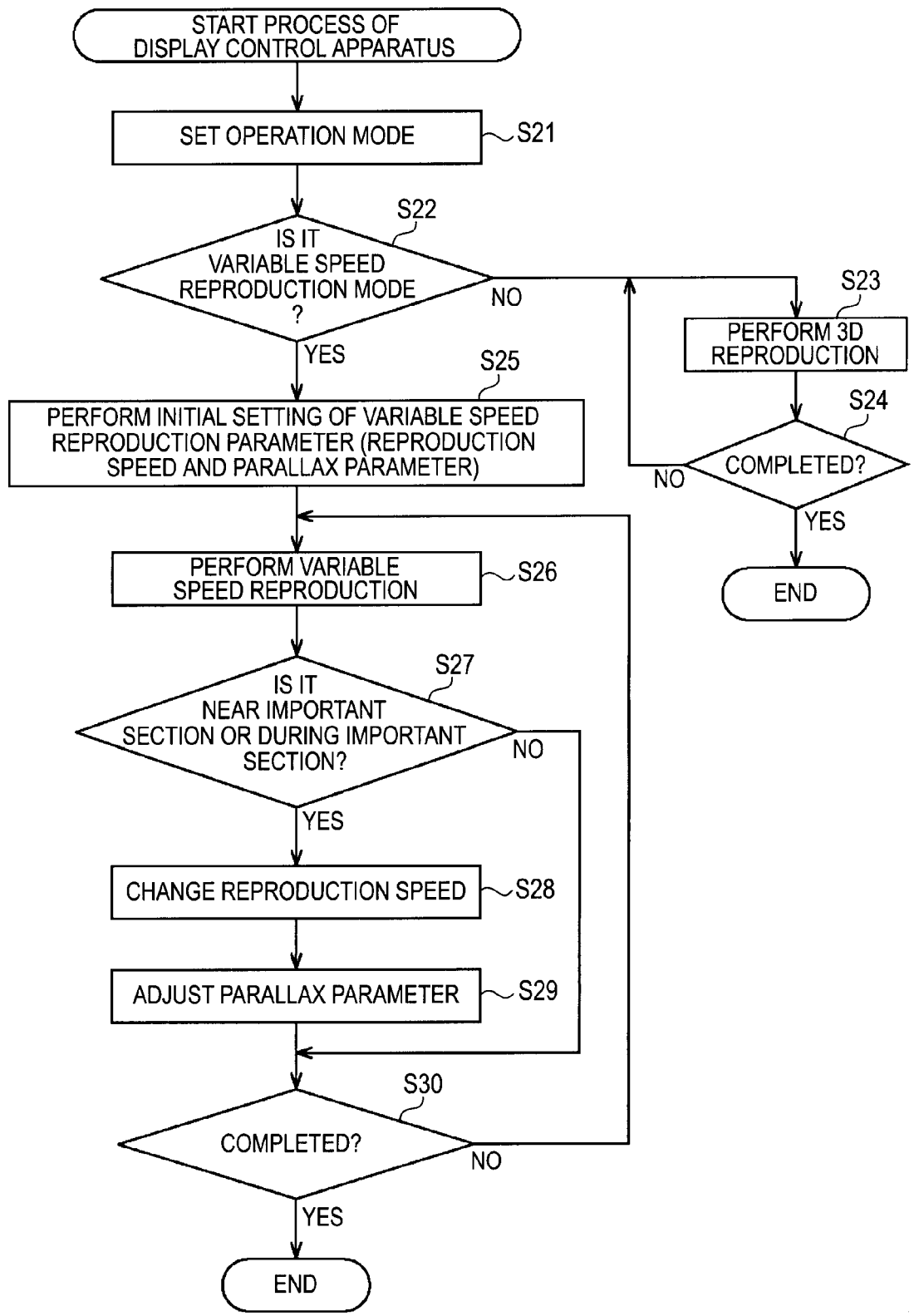
FIG. 13 is a flowchart illustrating the process of the display control apparatus shown in FIG. 9.

The process of the display control apparatus 1 shown in FIG. 9 will be described with reference to a flowchart represented in FIG. 13.

Here, it is assumed that detection of the important section is performed in advance. The information on the important section detected by the important section detecting unit 51 of the system controller 11 is supplied to the control unit 52 from the important section detecting unit 51.

In Step S21, the control unit 52 sets the operation mode in accordance with the user's operation. For example, when being directed to perform variable speed reproduction of content recorded on the recording medium 14, the control unit 52 sets the variable speed reproduction mode as the operation mode.

In Step S22, the control unit 52 determines whether or not the set mode is the variable speed reproduction mode.

When the set mode is determined not to be the variable speed reproduction mode in Step S22, the control unit 52 performs 3D reproduction at the normal speed by controlling each unit in Step S23.

In Step S24, the control unit 52 determines whether or not the reproduction of the content has been completed. When determining the reproduction of the content not to have been completed, the process proceeds back to Step S23, and the control unit 52 resumes to perform the 3D reproduction of the content. When the content is determined to have been completed in Step S24, the process ends.

On the other hand, when the set mode is determined to be the variable speed reproduction mode in Step S22, the control unit 52 performs initial setting of the variable speed reproduction parameter in Step S25. In the example represented in FIG. 11, here, information indicating that the reproduction speed is S5 is supplied from the control unit 52 to the reproduction processing unit 15, and the parallax parameter having a value P0 corresponding to the reproduction speed S5 is supplied from the control unit 52 to the content control unit 16.

In Step S26, the control unit 52 performs the variable speed reproduction by controlling each unit. Based on the image data acquired by reproducing the content by using the reproduction processing unit 15, appropriately a left-eye image and a right-eye image are generated by the content control unit 16.

The data of the left-eye image and the right-eye image generated by the content control unit 16 is output from the display control unit 17 to the TV 2.

In Step S27, the control unit 52 determines whether or not the current position of reproduction is a position near the important section or a position within the important section.

When the current position of reproduction is determined to be near the important section or the position within the important section in Step S27, the control unit 52, as described with reference to FIG. 11, changes the reproduction speed by controlling the reproduction processing unit 15 in Step S28.

In Step S29, the control unit 52 outputs a parallax parameter corresponding to the reproduction speed after the change to the content control unit 16. When the current position of reproduction is determined not to be in the position near the important section or the position within the important section in Step S27, Steps S28 and S29 are skipped.

In Step S30, the control unit 52 determines whether or not the reproduction of the content has been completed. When the reproduction of the content is determined not to have been completed in Step S30, the process proceeds back to Step S26, and the control unit 52 resumes to reproduce the content. On the other hand, when the reproduction of the content is determined to have been completed in Step S30, the process ends.

According to the above-described process, the fatigue felt by a user at a time when the variable speed reproduction of a 3D content is performed can be reduced.

MODIFIED EXAMPLES

As presented above, when a 3D image is generated based on a 2D image, an image of one frame acquired by reproducing a 2D content is set as a left-eye image, and an image acquired by delaying the image is set as a right-eye image. In other words, the left-eye image and the right-eye image are generated with the parallax given in the temporal direction. However, a left-eye image and a right-eye image may be configured with the parallax given in the spatial direction.

FIGS. 14A and 14B are diagrams representing an example of generation of a left-eye image and a right-eye image with the parallax given in the spatial direction.

For example, a case where a left-eye image and a right-eye image are generated based on a 2D image of one frame shown in FIG. 14A will be described. In such a case, for example, as shown on the left side in the FIG. 14B, the same image as the 2D image shown in FIG. 14A is used as a left-eye image, and as shown on the right side in FIG. 14B, an image in which the position of the subject is shifted is used as a right-eye image. The amount of space between the position of the subject in the left-eye image and the position of the subject in the right-eye image becomes the parallax.

In the same manner as for the amount of delay described above, by controlling the amount of space between the positions of the subject in accordance with the parallax parameter, the stereoscopic effect experienced by a user watching the content can be adjusted in accordance with the reproduction speed.

In addition, as above, a case where the content to be reproduced is a 2D content has been described. However, a 3D content in which data of a left-eye image and data of a right-eye image are prepared in advance may be configured to be used as a reproduction target. The left-eye image and the right-eye image included in the 3D content, as shown in FIG. 14B, are images having a space between the positions of the subject.

FIG. 15 is a block diagram representing a configuration example of the content control unit 16 for a case where the content to be reproduced is a 3D content.

As shown in FIG. 15, the content control unit 16 is configured by a motion vector detecting sections 31-1 and 31-2 and memories 32-1 and 32-2. The memories 32-1 and 32-2 are configured by delay lines.

By reproducing the 3D content, the data of the left-eye image output from the reproduction processing unit 15 is input to the motion vector detecting section 31-1 and the memory 32-1, and the data of the right-eye image is input to the motion vector detecting section 31-2 and the memory 32-2.

The motion vector detecting section 31-1, similarly to the motion vector detecting section 31 shown in FIG. 5, detects a motion vector based on the input data of the left-eye image and outputs the detected motion vector to the system controller 11. The motion vector detecting section 31-2, similarly to the motion vector detecting section 31-1, detects a motion vector based on the input data of the right-eye image and outputs the detected motion vector to the system controller 11.

In the system controller 11, for example, an average of the motion vector detected by the motion vector detecting section 31-1 and the motion vector detected by the motion vector detecting section 31-2 is calculated. In addition, the parallax parameter is adjusted based on the calculated average motion vector as described with reference to FIGS. 5 and 6. Alternatively, any one of the motion vector detecting section 31-1 and the motion vector detecting section 31-2 may be configured to detect the motion vector.

The memory 32-1 temporarily stores the input data of the left-eye image, delays the data by an amount of delay that is represented by the parallax parameter supplied from the system controller 11, and outputs the delayed data.

The memory 32-2 temporarily stores the input data of the right-eye image, delays the data by an amount of delay that is represented by the parallax parameter supplied from the system controller 11, and outputs the delayed data.

By controlling display timings of the left-eye image and the right-eye image having a space between the positions of the subject as described above, in other words, by giving the parallax in the temporal direction, the stereoscopic effect of the subject can be adjusted.

FIG. 16 is a block diagram representing another configuration example of the content control unit 16.

The content control unit 16 shown in FIG. 16 performs a process of giving the parallax in the spatial direction to the left-eye image and the right-eye image that have been input by extracting predetermined ranges from the left-eye image and the right-eye image in which there is a space between the positions of the subject.

The content control unit 16 shown in FIG. 16 is configured by motion vector detecting sections 31-1 and 31-2 and window processing sections 61-1 and 61-2. To each same constituent element as shown in FIG. 15, a same reference sign is assigned. In addition, duplicate description will be appropriately omitted.

By reproducing the 3D content, the data of the left-eye image output from the reproduction processing unit 15 is input to the motion vector detecting section 31-1 and the window processing section 61-1, and the data of the right-eye image is input to the motion vector detecting section 31-2 and the window processing section 61-2.

The window processing section 61-1 extracts a predetermined range from the entire input left-eye image and outputs an image acquired by performing an interpolation process as the left-eye image.

The window processing section 61-2, similarly to the window processing section 61-1, extracts a predetermined range from the entire input right-eye image and outputs an image acquired by performing an interpolation process as the right-eye image. To the window processing section 61-1 and the window processing section 61-2, information representing the extraction range is supplied from the system controller 11 as the parallax parameter.

Figure 17:
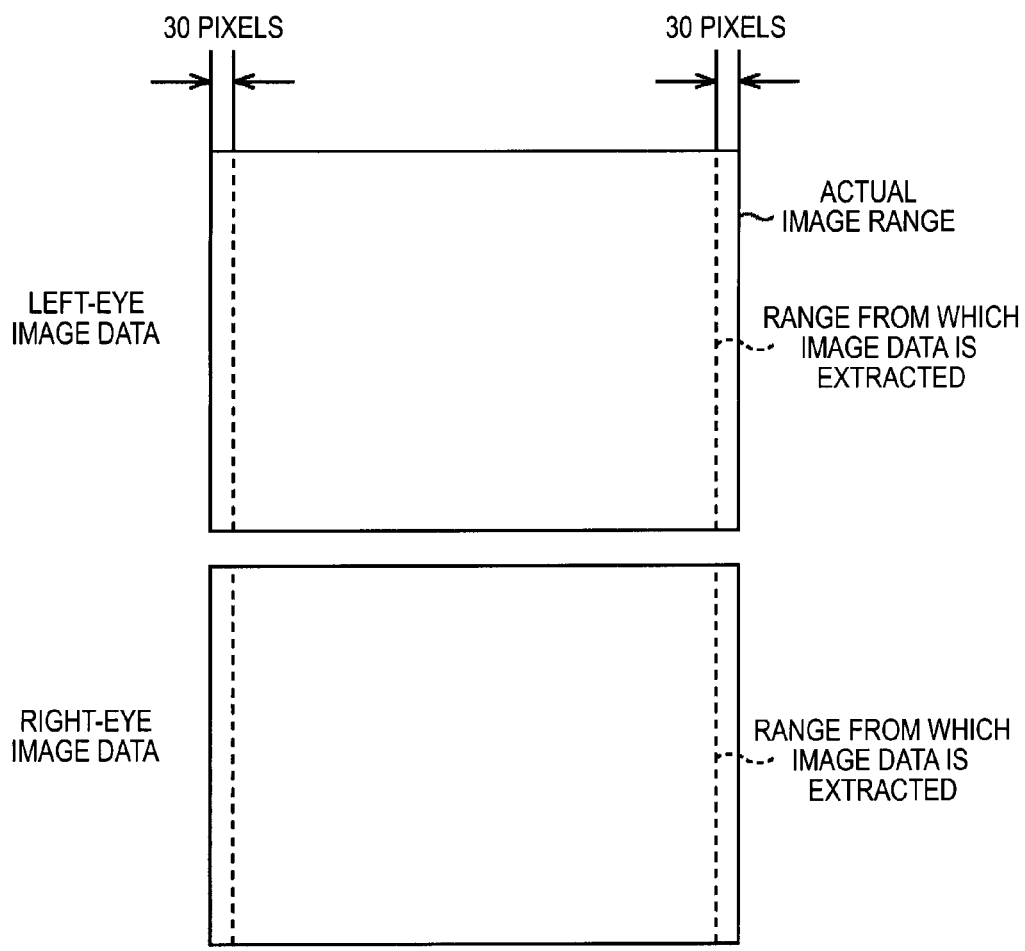
FIG. 17 is a diagram representing further another example of generation of a 3D image.

FIG. 17 is a diagram representing an example of the extraction range (window) of an image.

For example, when a left-eye image of one frame and a right-eye image of one frame are images of 640×480 pixels, as shown in FIG. 17, the extraction range is set within the range of 30 pixels from the left end or the right end so as to extract an image of 610×480 pixels.

In a case where all the right-eye images included in the 3D content are generated so as to be shifted from corresponding left-eye images to right side or the left side by a predetermined number of pixels, when the reproduction speed is higher than the normal speed, the extraction range is set in a direction for decreasing the amount of space. By setting the extraction range in the direction for decreasing the amount of space, the parallax between the left-eye image and the right-eye image output from the content control unit 16 is decreased. Accordingly, the stereographic effect experienced by a user viewing the images also decreases.

Figure 18:
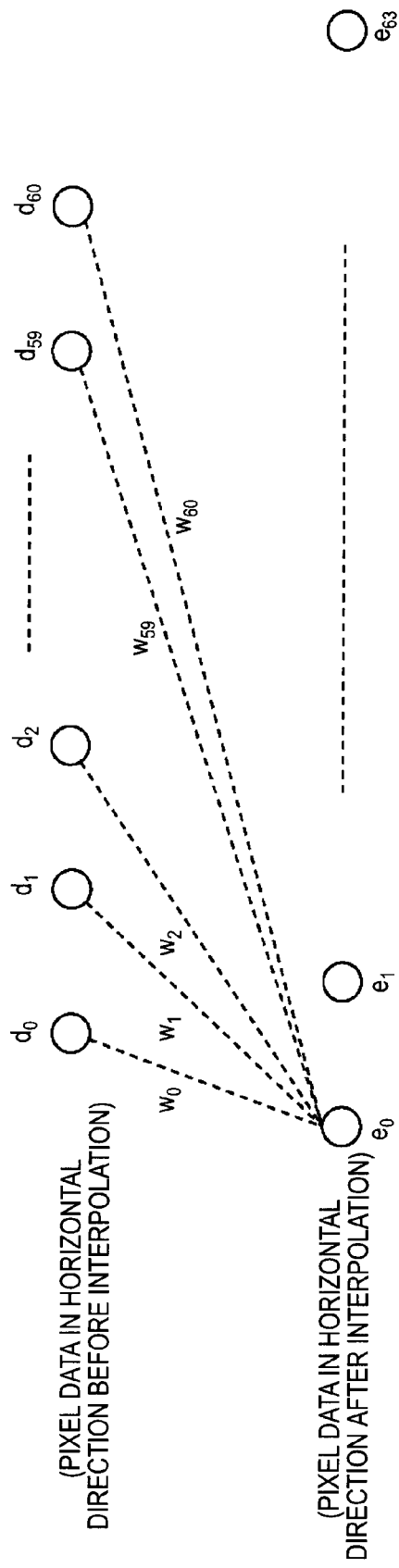
FIG. 18 is a diagram representing an example of interpolation of pixels.

FIG. 18 is a diagram representing an example of interpolation of pixels.

When the image is extracted as shown in FIG. 17, a portion of the entire one frame image of 640×480 pixels other than the extraction portion becomes a black belt. In order to eliminate such a black belt, interpolation of pixels is performed by the window processing sections 61-1 and 61-2. The interpolation of pixels is performed such that data of 640 pixels including pixels outside the extraction portion in the horizontal direction is generated from data of 610 pixels in the horizontal direction within the extraction range.

In order to simplify the description, the number of pixels is assumed to be 1/10 of the number of actual pixels, and a case where data of 64 pixels $e_n$ (0≦n≦63) is generated from data of 61 pixels $d_n$ (0≦n≦60) will be considered. As an interpolation technique, as represented in FIG. 18, there is a method in which interpolation is performed by multiplying pixel values of the pixels by weighting factors corresponding to the distances to pixels used for the interpolation with the position of the pixel to be generated being used as a reference. When such an interpolation technique is represented in a numerical expression, the interpolation technique can be represented as the following Equation (1).

$$e_n = \sum_{n=0}^{60} (W_n \cdot d_n) \quad (W_n: \text{weighting factor}) \quad \text{Equation (1)}$$

$$\sum_{n=0}^{60} W_n = 1$$

$$W_n \propto |\text{position of } e_n - \text{position of } d_n|$$

Figure 19:
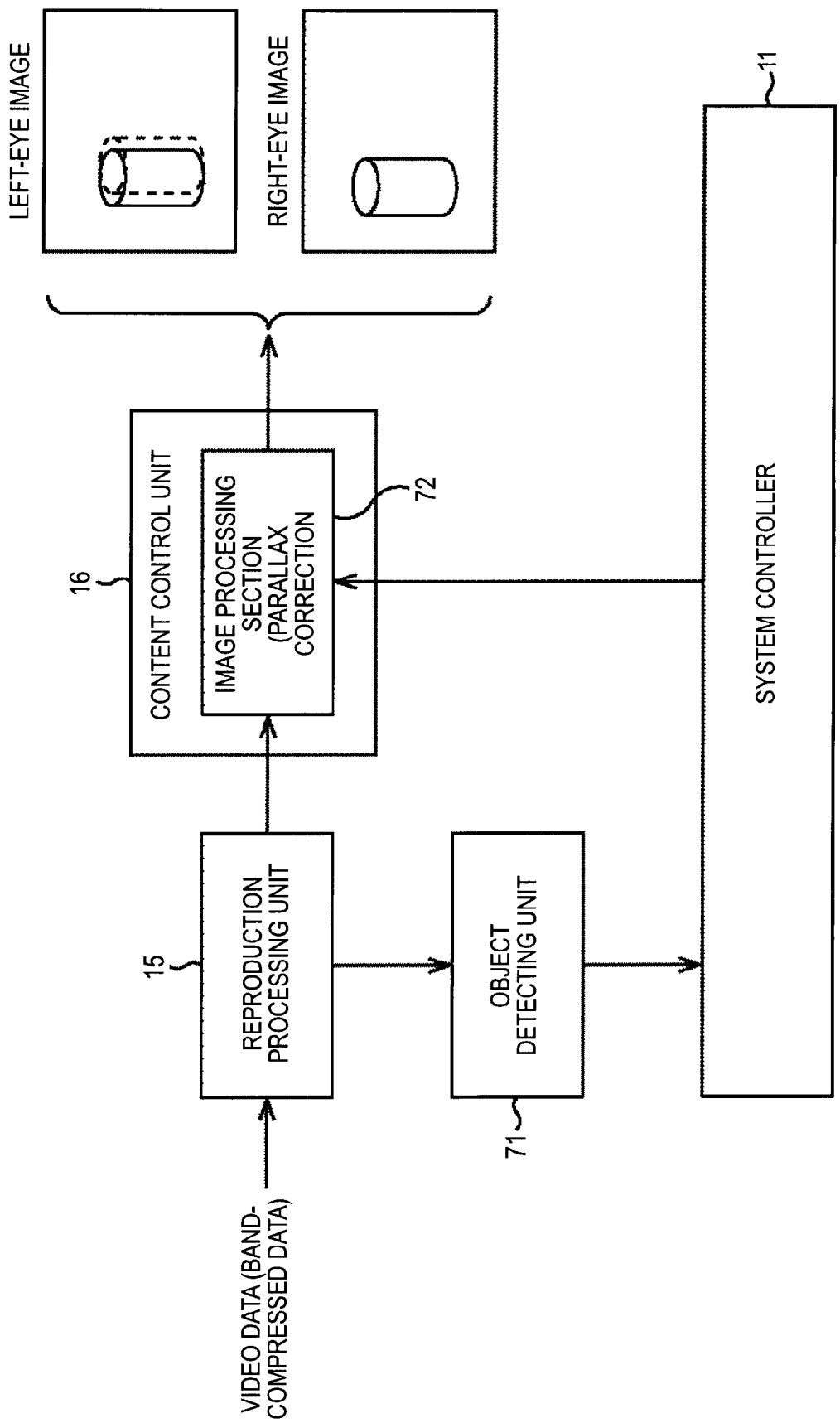
FIG. 19 is a diagram representing further another example of generation of a 3D image.

FIG. 19 is a diagram representing an example of another parallax control technique.

When a 2D content to be reproduced is object-coded data such as MPEG (Moving Picture Experts Group) 4, a case where a left-eye image and a right-eye image are generated by detecting an object by using object detection data and controlling the position of the object may be considered. In the MPEG4 data, a person, a background, and the like are coded as different objects. Accordingly, in a decoding-side device, such objects can be arbitrarily moved.

The reproduction processing unit 15 shown in FIG. 19 decodes a 2D content that is MPEG4-coded data and outputs data of a 2D image to the content control unit 16. In addition, the reproduction processing unit 15 outputs the object detection data to an object detecting unit 71.

The object detecting unit 71 detects a foreground and a background (object) based on the object detection data and outputs the information on the foreground and the background to the system controller 11.

An image processing section 72 of the content control unit 16 generates one frame image that is acquired by composing the foreground and the background at a position (standard position) designated by the coded data under the control of the system controller 11 as a left-eye image. In addition, the image processing section 72 generates an image acquired by shifting the foreground included in the left-eye image in a predetermined direction as a right-eye image. The amount of space of the position of the foreground is controlled by the system controller 11 based on the parallax parameter.

In the description presented above, the display control apparatus 1 is provided as a device of a casing different from the TV 2, and the display control apparatus 1 serves as an information processing apparatus that outputs an image to the TV 2. However, the display control apparatus 1 may be disposed inside the TV 2.

In addition, in FIG. 9, detection of an important section and control of the reproduction speed and the parallax parameter are performed by the display control apparatus 1. However, the control of the reproduction speed and the parallax parameter may be configured to be performed on the TV 2 side.

Figure 20:
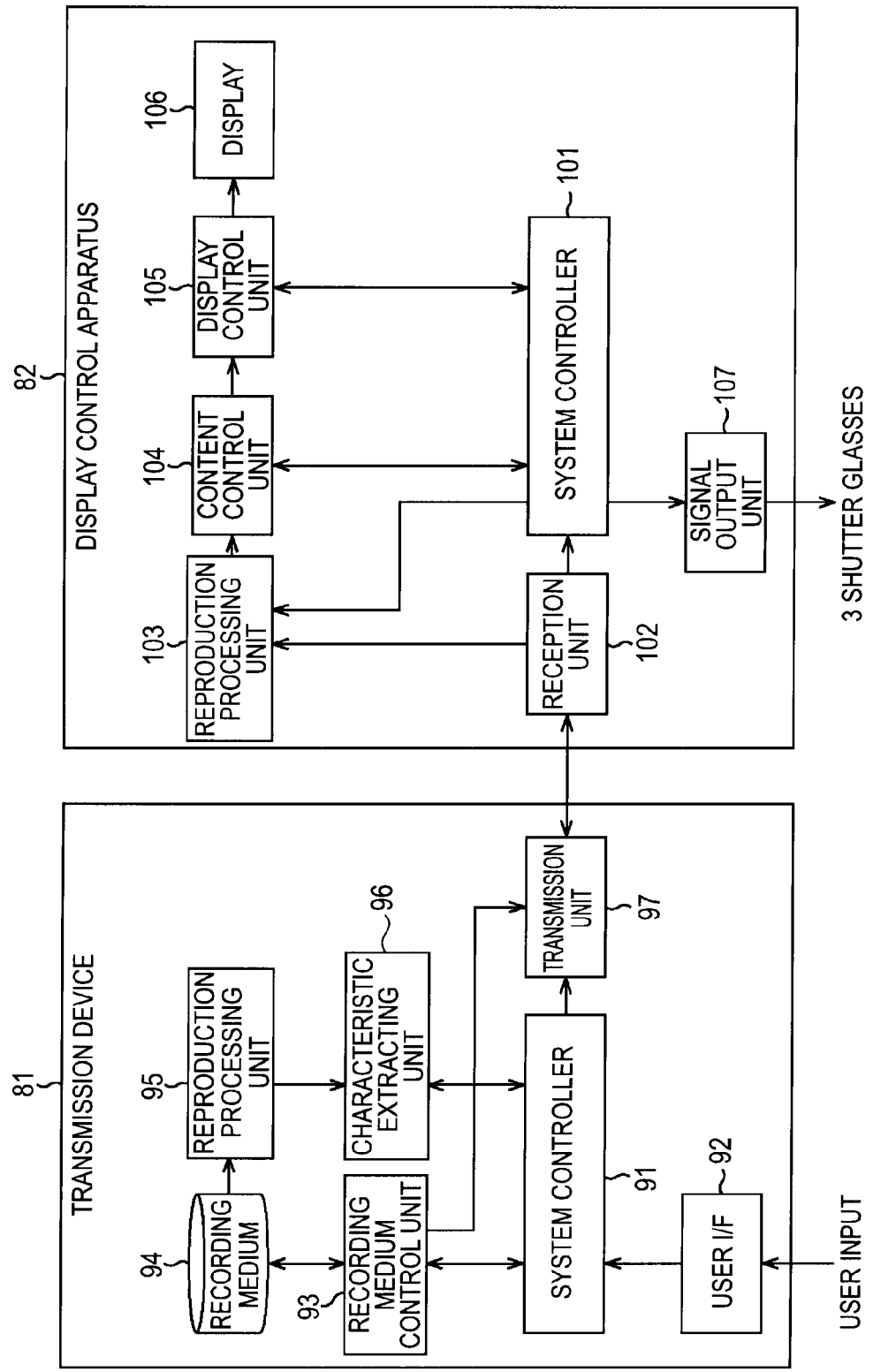
FIG. 20 is a diagram representing a configuration example of a 3D image display system according to another embodiment of the present invention.

FIG. 20 is a diagram representing another configuration example of the 3D image display system.

The 3D image display system shown in FIG. 20 is configured by a transmission device 81 and a display control apparatus 82. The display control apparatus 82, for example, is a device that is disposed inside the TV 2 and communicates with a transmission device 81 externally disposed as a device of a casing other than the TV 2 through an HDMI specifications-compliant cable.

In the 3D image display system shown in FIG. 20, detection of an important section is performed by the transmission device 81, and information on the important section is transmitted together with the content from the transmission device 81 to the display control apparatus 82. In the display control apparatus 82, the content transmitted from the transmission device 81 is reproduced, and, as described with reference to FIG. 11, the reproduction speed and the parallax parameter are controlled.

As shown in FIG. 20, the transmission device 81 is configured by a system controller 91, a user I/F 92, a recording medium control unit 93, a recording medium 94, a reproduction processing unit 95, a characteristic extracting unit 96, and a transmission unit 97. The user I/F 92, the recording medium control unit 93, the recording medium 94, the reproduction processing unit 95, and the characteristic extracting unit 96 correspond to the user I/F 12, the recording medium control unit 13, the recording medium 14, the reproduction processing unit 15, and the characteristic extracting unit 41 shown in FIG. 9, respectively.

The system controller 91 controls the overall operation of the transmission device 81 in accordance with a signal representing the content of a user's operation that is supplied from the user I/F 92. In the system controller 91 shown in FIG. 20, the important section detecting unit 51 included in the configuration shown in FIG. 12 is disposed.

For example, the system controller 91 detects an important section based on the characteristic data supplied from the characteristic extracting unit 96. The system controller 91 outputs information on the detected important section to the transmission unit 97.

The user I/F 92 detects a user's operation for a remote controller such as a selection operation of a program to be reproduced and outputs a signal representing the content to the system controller 91.

The recording medium control unit 93 receives a broadcasted content based on a signal transmitted from an antenna not shown in the figure and records the content on the recording medium 94. When being directed to reproduce a content that is recorded on the recording medium 94, the recording medium control unit 93 outputs the content to be reproduced to the reproduction processing unit 95. In addition, the recording medium control unit 93 outputs the content to be reproduced to the transmission unit 97.

The reproduction processing unit 95 performs a reproduction process such as a decoding process that decompresses compressed data of the content to be reproduced. The reproduction processing unit 95 outputs image data and audio data acquired by performing a reproduction process to the characteristic extracting unit 96. Any one of the image data and the audio data may be configured so as to be used as a target from which the characteristic is extracted.

The characteristic extracting unit 96 extracts the characteristics of the image data and the audio data that are supplied from the reproduction processing unit 95 and outputs characteristic data that is data representing the extracted characteristics to the system controller 91.

The transmission unit 97 transmits the content supplied from the recording medium control unit 93 to the display control apparatus 82 through an HDMI specifications-compliant cable. In addition, the transmission unit 97 stores the information on the important section supplied from the system controller 91 in an HDMI Vendor Specific InfoFrame Packet defined in HDMI specifications version 1.4 or the like and transmits the information to the display control apparatus 82.

The HDMI Vendor Specific InfoFrame Packet is a packet that is used for transmission and reception of a control command defined by each vendor. The HDMI Vendor Specific InfoFrame Packet is transmitted from a transmission-side device to a reception-side device through a CEC (Consumer Electronics Control) line of HDMI. The information on the important section includes information representing the position (time) of the important section.

The display control apparatus 82 is configured by a system controller 101, a reception unit 102, a reproduction processing unit 103, a content control unit 104, a display control unit 105, a display 106, and a signal output unit 107. The reproduction processing unit 103, the content control unit 104, the display control unit 105, and the signal output unit 107 correspond to the reproduction processing unit 15, the content control unit 16, the display control unit 17, and the signal output unit 18 shown in FIG. 9, respectively.

The system controller 101 controls the overall operation of the display control apparatus 82 and reproduces the content transmitted from the transmission device 81. In the system controller 101 shown in FIG. 20, the control unit 52 included the configuration represented in FIG. 12 is disposed.

The system controller 101 monitors the current position of reproduction during the reproduction process of the content and controls the reproduction speed of the content and the parallax parameter as described with reference to FIG. 11.

The reception unit 102 receives the content and the information on the important section transmitted from the transmission device 81 and outputs the content and the information on the important section to the reproduction processing unit 103 and the system controller 101.

The reproduction processing unit 103 performs a reproduction process such as a decoding process that decompresses compressed data of the content supplied from the reception unit 102. The reproduction processing unit 103 outputs data of a 2D image acquired by performing a reproduction process to the content control unit 104. The audio data that is used for outputting audio in accordance with an image of the content is output to an external speaker or the like through a circuit not shown in the figure.

The content control unit 104 has the same configuration as that shown in FIG. 5 or 7. When a 3D image is to be displayed, the content control unit 104 generates data of a left-eye image and a right-eye image based on the data of a 2D image that is supplied from the reproduction processing unit 103 and outputs the data of the left-eye image and the right-eye image to the display control unit 105. The parallax between the left-eye image and the right-eye image generated by the content control unit 104 is adjusted based on the parallax parameter supplied from the system controller 101. On the other hand, when a 2D image is to be displayed, the content control unit 104 outputs the data of the 2D image, which is supplied from the reproduction processing unit 103, to the display control unit 105.

The display control unit 105 displays a 2D image or a 3D image in the display 106 based on the image data supplied from the content control unit 104.

The signal output unit 107 controls the shutter operation of the shutter glasses 3 by transmitting a control signal as described with reference to FIGS. 4A and 4B.

In the 3D image display system having the above-described configuration, as described with reference to FIG. 11, the reproduction speed and the parallax parameter can be adjusted based on whether or not the current position of reproduction is a position in the important section or a position prior to or next to the important section.

In addition, the information representing the relationship between the reproduction speed and the parallax parameter shown in FIG. 2 or 11 may not be set by the system controller 101 of the display control apparatus 82 but be configured to be transmitted from the transmission device 81 to the display control apparatus 82. The information representing the relationship between the reproduction speed and the parallax parameter, similarly to the information on the important section, is transmitted with being stored in an HDMI Vendor Specific InfoFrame Packet or the like.

The watching type of a 3D image has been described as a glass type. However, a naked-eye type may be employed.

The above-described series of processes may be performed by hardware or software. When the series of processes is performed by software, a program configuring the software is installed from a program recording medium to a computer that is built in dedicated hardware or a general purpose personal computer, or the like.

FIG. 21 is a block diagram representing a configuration example of hardware of a computer that performs the above-described series of processes by a program.

A CPU (Central Processing Unit) 121, a ROM (Read Only Memory) 122, and a RAM (Random Access Memory) 123 are interconnected through a bus 124.

In addition, an input/output interface 125 is connected to the bus 124. To the input/output interface 125, an input unit 126 that is configured by a keyboard, a mouse, or the like, and an output unit 127 that is configured by a display, a speaker or the like are connected. In addition, to the input/output interface 125, a memory unit 128 that is configured by a hard disk, a non-volatile memory, or the like, a communication unit 129 that is configured by a network interface or the like, and a drive 130 that drives a removable medium 131 are connected.

In the computer configured as described above, the above-described series of processes is performed, for example, by loading a program stored in the memory unit 128 into the RAM 123 through the input/output interface 125 and the bus 124 and executing the loaded program by using the CPU 121.

The program executed by the CPU 121, for example, is recorded on a removable medium 131 or supplied through a local area network, the Internet, digital broadcast, or a wired or wireless transmission medium and is installed in the memory unit 128.

The program executed by the computer may be a program that performs the processes in a time series in accordance with the procedure described as above, a program that performs the processes in a parallel manner, or a program that performs the processes at a necessary timing such as a time when the program is called.

The embodiments of the present invention are not limited to the above-described embodiments and may be variously changed within the scope not departing from the concept of the present invention.

What is claimed is:

1. A video display apparatus, comprising:
    circuitry configured to:
        determine a reproduction speed of a video, and set a parallax parameter corresponding to a difference between an image of the video displayed to a right eye of a user and an image of the video displayed to a left eye of the user to one of a plurality of non-zero values based on the reproduction speed of the video; and
        control reproduction of the video based on the parallax parameter set by the system controller.

2. The video display apparatus of claim 1, wherein
    the circuitry is configured to determine the reproduction speed of the video is changed, and set the parallax parameter corresponding to the changed reproduction speed.

3. The video display apparatus of claim 2, wherein
    the circuitry is configured to decrease the parallax parameter to one of the plurality of non-zero values after determining the reproduction speed is increased.

4. The video display apparatus of claim 2, wherein
    the circuitry is configured to increase the parallax parameter after determining the reproduction speed is decreased.

5. The video display apparatus of claim 1, wherein
    the circuitry is configured to determine a position of the reproduced video is near a predetermined section.

6. The video display apparatus of claim 5, wherein
    the circuitry is configured to decrease the reproduction speed based on the determination the position of the reproduced video is near the predetermined section.

7. The video display apparatus of claim 5, wherein
    the circuitry is configured to increase the parallax parameter based on the determination the position of the reproduced video is near the predetermined section.

8. The video display apparatus of claim 1, wherein
    the circuitry is configured to continuously calculate a climax evaluation value by analyzing the video, and compare the climax evaluation value to a predetermined threshold value.

9. The video display apparatus of claim 8, wherein
    when it is determined that the climax evaluation value exceeds the predetermined threshold value, the circuitry is configured to:
        automatically decrease the reproduction speed of the video; and
        increase the parallax parameter of the video.

10. The video display apparatus of claim 8, wherein
    the circuitry is configured to calculate the climax evaluation value by comparing pixel values of frames of the video with one another, and calculate the climax evaluation value based on the comparison.

11. A non-transitory computer-readable medium including computer program instructions, which when executed by a video display control apparatus, causes the video display control apparatus to perform a method comprising:
    determining a reproduction speed of a video;
    setting a parallax parameter corresponding to a difference between an image of the video displayed to a right eye of a user and an image of the video displayed to a left eye of the user to one of a plurality of non-zero values based on the reproduction speed of the video; and
    controlling reproduction of the video based on the set parallax parameter.

12. The non-transitory computer-readable medium of claim 11, further comprising:
    determining the reproduction speed is changed; and
    setting the parallax parameter corresponding to the changed reproduction speed.

13. The non-transitory computer-readable medium of claim 12, further comprising:
    decreasing the parallax parameter to one of the plurality of non-zero values after determining the reproduction speed is increased.

14. The non-transitory computer-readable medium of claim 12, further comprising:
    increasing the parallax parameter after determining the reproduction speed of the video is decreased.

15. The non-transitory computer-readable medium of claim 11, further comprising:
    determining that a position of the reproduced video is near a predetermined section.

16. The non-transitory computer-readable medium of claim 15, further comprising:
    decreasing the reproduction speed based on the determination that the position of the reproduced video is near the predetermined section.

17. The non-transitory computer-readable medium of claim 15, further comprising:
    increasing the parallax parameter based on the determination that the position of the reproduced video is near the predetermined section.

18. A video display method performed by a video display control apparatus, the method comprising:
    determining, by a controller of the video display control apparatus, a reproduction speed of a video;
    setting, by the controller of the video display control apparatus, a parallax parameter corresponding to a difference between an image of the video displayed to a right eye of a user and an image of the video displayed to a left eye of the user to one of a plurality of non-zero values based on the reproduction speed; and controlling, by a content control unit of the video display control apparatus, reproduction of the video based on the set parallax parameter.

19. A video display control apparatus, comprising:

means for determining a reproduction speed of a video;

means for setting a parallax parameter corresponding to a difference between an image of the video displayed to a right eye of a user and an image of the video displayed to a left eye of the user to one of a plurality of non-zero values based on the reproduction speed; and means for controlling reproduction of the video based on the set parallax parameter.

\* \* \* \* \*